(12) United States Patent
Gupta et al.

(10) Patent No.: US 8,306,972 B2
(45) Date of Patent: *Nov. 6, 2012

(54) ORDERING OF SEARCH RESULTS BASED ON LANGUAGE AND/OR COUNTRY OF THE SEARCH RESULTS

(75) Inventors: Vineet Gupta, Bangalore (IN); Benedict Gomes, Mountain View, CA (US); John Lamping, Los Altos, CA (US); Mizuki McGrath, Minato-ku (JP); Amitabh K Singhal, Palo Alto, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/255,253

(22) Filed: Oct. 21, 2008

(65) Prior Publication Data

US 2009/0055392 A1 Feb. 26, 2009

Related U.S. Application Data

(63) Continuation-in-part of application No. 10/407,476, filed on Apr. 3, 2003, now Pat. No. 7,451,129, which is a continuation of application No. 10/607,927, filed on Jun. 27, 2003, now Pat. No. 7,451,130.

(60) Provisional application No. 60/459,339, filed on Mar. 31, 2003, provisional application No. 60/479,166, filed on Jun. 16, 2003.

(51) Int. Cl.
G06F 17/30 (2006.01)

(52) U.S. Cl. .................... 707/724; 707/732

(58) Field of Classification Search .......... 707/722–724, 707/732–734
See application file for complete search history.

(56) References Cited

U.S. PATENT DOCUMENTS

| 5,056,021 A | 10/1991 | Ausborn |
| 5,148,541 A | 9/1992 | Lee et al. |
| 5,416,903 A | 5/1995 | Malcolm |
| 5,488,725 A | 1/1996 | Turtle et al. |
| 5,778,356 A | 7/1998 | Heiny |
| 6,167,369 A | 12/2000 | Schulze |

(Continued)

FOREIGN PATENT DOCUMENTS

EP 0 944 002 9/1999

(Continued)

OTHER PUBLICATIONS

Non-final Office Action mailed Jan. 31, 2006 for co-pending U.S. Appl. No. 10/607,927, 41 pages.

(Continued)

*Primary Examiner* — Khanh Pham
(74) *Attorney, Agent, or Firm* — Harrity & Harrity, LLP

(57) ABSTRACT

A system and method for providing preferred language and/or country ordering of search results is described. A search query describing potentially retrievable information provided in a plurality of search result languages and/or countries is received. A search is executed by evaluating the search query against information characteristics maintained in a searchable data repository. At least one preferred language and/or country applicable to search results generated is dynamically determined responsive to the executed search. At least some of the search results are ordered in consideration of the at least one preferred language and/or country.

27 Claims, 24 Drawing Sheets

U.S. PATENT DOCUMENTS

| | | | |
|---|---|---|---|
| 6,173,275 | B1 | 1/2001 | Cald et al. |
| 6,285,999 | B1 | 9/2001 | Page |
| 6,311,180 | B1 | 10/2001 | Fogarty |
| 6,356,894 | B2 | 3/2002 | Nosohara |
| 6,370,498 | B1 | 4/2002 | Flores et al. |
| 6,377,961 | B1 | 4/2002 | Ryu |
| 6,446,061 | B1 | 9/2002 | Doerre et al. |
| 6,510,406 | B1 | 1/2003 | Marchisio |
| 6,516,337 | B1 | 2/2003 | Meadway et al. |
| 6,542,888 | B2 | 4/2003 | Marques |
| 6,560,597 | B1 | 5/2003 | Dhillon et al. |
| 6,623,529 | B1 | 9/2003 | Lakritz |
| 6,675,159 | B1 | 1/2004 | Lin et al. |
| 6,701,305 | B1 | 3/2004 | Holt et al. |
| 6,711,585 | B1 | 3/2004 | Copperman et al. |
| 6,947,993 | B2 * | 9/2005 | Hendren, III .................. 709/228 |
| 6,952,691 | B2 | 10/2005 | Drissi et al. |
| 7,028,027 | B1 | 4/2006 | Zha et al. |
| 7,548,846 | B1 * | 6/2009 | Monster ........................... 704/8 |
| 2002/0059228 | A1 | 5/2002 | McCall et al. |
| 2002/0082464 | A1 | 6/2002 | Oblein et al. |
| 2003/0046056 | A1 | 3/2003 | Godov et al. |
| 2003/0191817 | A1 * | 10/2003 | Fidler ........................... 709/219 |
| 2004/0088196 | A1 | 5/2004 | Childress et al. |
| 2004/0111254 | A1 | 6/2004 | Gogel et al. |
| 2004/0128282 | A1 | 7/2004 | Kleinberger et al. |
| 2004/0194099 | A1 | 9/2004 | Lamping et al. |
| 2004/0254932 | A1 | 12/2004 | Gupta et al. |
| 2006/0200766 | A1 | 9/2006 | Lakritz |

FOREIGN PATENT DOCUMENTS

| | | |
|---|---|---|
| JP | H09-305518 A | 11/1997 |
| WO | WO 00/41090 | 7/2000 |
| WO | WO 01/25947 | 4/2001 |
| WO | WO 02/07011 | 1/2002 |

OTHER PUBLICATIONS

Final Office Action mailed Sep. 28, 2006 for co-pending U.S. Appl. No. 10/607,927, 51 pages.

Non-final Office Action mailed Jun. 12, 2007 for co-pending U.S. Appl. No. 10/607,927, 19 pages.

Final Office Action mailed Jan. 23, 2008 for co-pending U.S. Appl. No. 10/607,927, 18 pages.

S. Brin and L. Page, "The Anatomy of a Large-Scale Hypertextual Search Engine," (1998).

D. Gourley and E. Totty, "HTTP, the Definitive Guide," 2002, Ch. 3, pp. 43-73, O'Reilly and Assocs., Sebastopol, CA.

Christina Yip Chung et al., "Thermatic Mapping- From Unstructured Documents to Taxonomies," CIKM'02, Nov. 4-9, 2002, pp. 608-610, ACM, McLean, Virginia, USA.

Hiroyuki Kawano, "Overview of Mondou Web Search Engine Using Text Mining and Information Visualizing Technologies," IEEE, 2001, pp. 234-241.

James Osborn et al., "Justice: A Judicial Search Tool Using Intelligent Concept Extraction," ICAIL-99, 1999, pp. 173-181, ACM.

Chen An et al., "Fuzzy Concept Graph and Application in Web Document Clustering," 2001, pp. 101-106, IEEE.

Non-final Office Action mailed Jan. 31, 2006 for co-pending U.S. Appl. No. 10/407,476, 42 pages.

Final Office Action mailed Oct. 31, 2006 for co-pending U.S. Appl. No. 10/407,476, 46 pages.

Non-final Office Action mailed Jun. 13, 2007 for co-pending U.S. Appl. No. 10/407,476, 16 pages.

Final Office Action mailed Jan. 23, 2008 for co-pending U.S. Appl. No. 10/407,476, 17 pages.

* cited by examiner

21

ORDERING OF SEARCH RESULTS BASED ON LANGUAGE AND/OR COUNTRY OF THE SEARCH RESULTS

CROSS REFERENCE TO RELATED APPLICATIONS

This application is a continuation-in-part of U.S. patent application Ser. No. 10/407,476, filed Apr. 3, 2003, which claims priority under 35 U.S.C. §119(e) to U.S. Provisional Application No. 60/459,339, filed Mar. 31, 2003; and is a continuation of U.S. patent application Ser. No. 10/607,927, filed Jun. 27, 2003, which claims priority under 35 U.S.C. §119(e) to U.S. Provisional Application No. 60/479,166, filed Jun. 16, 2003, all of which are incorporated herein by reference.

FIELD OF INVENTION

The present invention relates in general to information location and, in particular, to a system and method for providing preferred language and/or country ordering of search results.

BACKGROUND OF THE INVENTION

Although the Internet traces back to the late 1960s, the widespread availability and acceptance of personal computing and internetworking have resulted in the explosive growth and unprecedented advances in information sharing technologies. In particular, the Worldwide Web ("Web") has revolutionized accessibility to untold volumes of information in stored electronic form to a worldwide audience, including written, spoken (audio) and visual (imagery and video) information, both in archived and real-time formats. In short, the Web has provided desktop access to every connected user to a virtually unlimited library of information in almost every language worldwide.

Information exchange on the Web operates under a client-server model. Individual clients execute Web content retrieval and presentation applications, typically in the form of Web browsers. The Web browsers send request messages for Web content to centralized Web servers, which function as data storage and retrieval repositories. The Web servers parse the request messages and return the requested Web content in response messages.

Search engines have evolved in tempo with the increased usage of the Web to enable users to find and retrieve relevant Web content in an efficient and timely manner. As the amount and types of Web content has increased, the sophistication and accuracy of search engines has likewise improved. Generally, search engines strive to provide the highest quality results in response to a search query. However, determining quality is difficult, as the relevance of retrieved Web content is inherently subjective and dependent upon the interests, knowledge and attitudes of the user.

Existing methods used by search engines are based on matching search query terms to terms indexed from Web pages. More advanced methods determine the importance of retrieved Web content using, for example, a hyperlink structure-based analysis, such as described in S. Brin and L. Page, "The Anatomy of a Large-Scale Hypertextual Search Engine," (1998) and in U.S. Pat. No. 6,285,999, issued Sep. 4, 2001 to Page, the disclosures of which are incorporated by reference.

A typical search query scenario begins with either a natural language question or individual keywords submitted to a search engine. The search engine executes a search against a data repository describing information characteristics of potentially retrievable Web content and identifies the candidate search results. Searches can often return thousands or even millions of results, so most search engines typically rank or score only a subset of the most promising results. Targeted search results can also be introduced, such as advertising or topical information content. The top search results are then presented to the user, usually in the form of Web content titles, hyperlinks, and other descriptive information, such as snippets of text taken from the search results.

Search engines are generally available to users located worldwide. Thus, part of providing high-quality search results is being able to provide those search results in languages acceptable to the requesting user, and/or from countries preferred by the requesting user.

Acceptable languages include languages specified by the user, as well as other acceptable languages. For instance, a French-preferring user might also accept search results in English. Acceptable languages can also include related languages and dialects. For example, Portuguese search results might be acceptable to a user who generally prefers Spanish. Finally, acceptable languages can include dead languages, such as classical Greek or Olde English, or psuedo-languages, such as Klingon. Dead and psuedo-languages are typically not supported by search engines, but may nevertheless reflect the academic, historic, or personal interests of the requesting user.

Preferred countries include the country of the user, as well as other acceptable countries. For instance, a Canadian user might also accept search results from the United States.

SUMMARY OF THE INVENTION

According to one implementation, a method may include receiving a search query; performing a search based on the search query to identify search results in a number of search result languages; identifying a particular language for the search results based on characteristics of the search query, characteristics of a user interface via which the search query is received, and characteristics of the search results; ordering the search results to create an ordered list of search results; determining whether the search results in the ordered list of search results are in the particular language; adjusting the ordering of one of the search results among other ones of the search results to create an adjusted list of search results when the one of the search results is in the particular language; and presenting the adjusted list of search results.

According to another implementation, a method may include receiving a search query; performing a search based on the search query to identify search results from a number of search result countries; identifying a particular country for the search results based on interface characteristics and Internet protocol (IP) characteristics, where the interface characteristics include information from the search query and information from a user interface via which the search query is received, and where the IP characteristics include information associated with a location from which the search query was sent; ordering the search results to create an ordered list of search results; determining whether the search results in the ordered list of search results are from the particular country; adjusting the order of one of the search results among other ones of the search results to create an adjusted list of search results when the one of the search results is from the particular country; and presenting the adjusted list of search results.

DETAILED DESCRIPTION

System Overview

Figure 1:
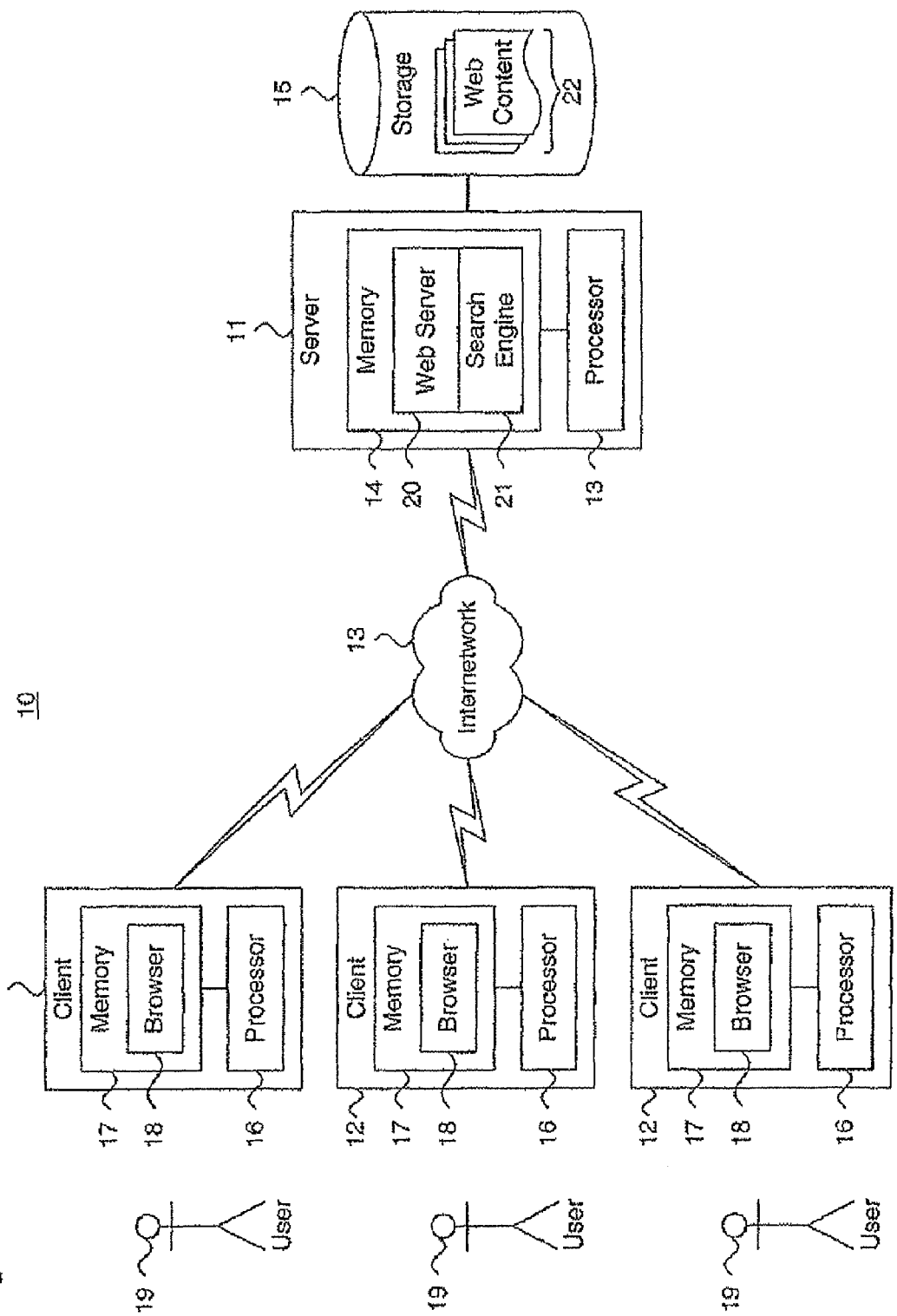
FIG. 1 is a block diagram showing a system for providing preferred language and/or country ordering of search results, in accordance with the present invention.

FIG. 1 is a block diagram showing a system 10 for providing preferred language and/or country ordering of search results, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content and other operations through their respective client 12.

In general, each client 12 can be any form of computing platform connectable to a network, such as the internetwork 13, and capable of interacting with application programs. Exemplary examples of individual clients include, without limitation, personal computers, digital assistances, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content exchange and, in particular, to transact searches, each client 12 executes a Web browser 18 ("browser") through which search queries are sent to a Web server 20 executing on the server 11. Each search query describes or identifies information, generally in the form of Web content, which is potentially retrievable via the Web server 20. The search query provides characteristics, typically expressed as terms, such as keywords and the like, and attributes, such as language or country, character encoding and so forth, which enables a search engine 21, also executing on the server 11, to identify and send back search results. The terms and attributes are a form of metadata, which constitute data describing data. Other styles, forms or definitions of search queries, search query characteristics, and metadata are feasible, as would be recognized by one skilled in the art.

The search results are sent back to the browser 18 for presentation, usually in the form of Web content titles, hyperlinks, and other descriptive information, such as snippets of text taken from the search results. The server 11 maintains an attached storage device 15 in which Web content 22 is maintained. The Web content 22 could also be maintained remotely on other Web servers (not shown) interconnected either directly or indirectly via the internetwork 13 and which are preferably accessible by each client 12.

The search engine 21 preferably identifies the Web content 22 best matching the search query terms to provide high quality search results, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 22, the search engine 21 operates on information characteristics describing potentially retrievable Web content, as further described below with reference to FIG. 3 or FIG. 14. Note the functionality provided by the server 20, including the Web server 20 and search engine 21, could be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Search Engine Components

Figure 2:
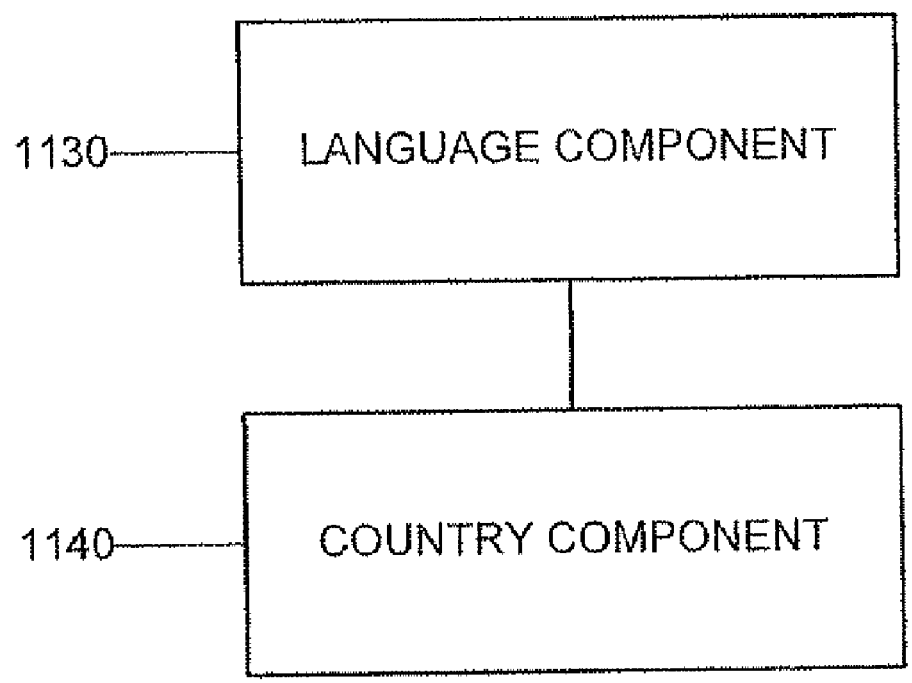
FIG. 2 is a functional block diagram of the search engine of FIG. 1.

FIG. 2 is a functional block diagram of the search engine 21 of FIG. 1. As shown in FIG. 2, the search engine 21 may include a language component 1130 and a country component 1140. The language component 1130 may provide a preferred language ordering of search results. The country component 1140 may provide a preferred country ordering of search results. The language component 1130 and the country component 1140 may operate alone or in concert to order search results.

Language Implementation

Figure 3:
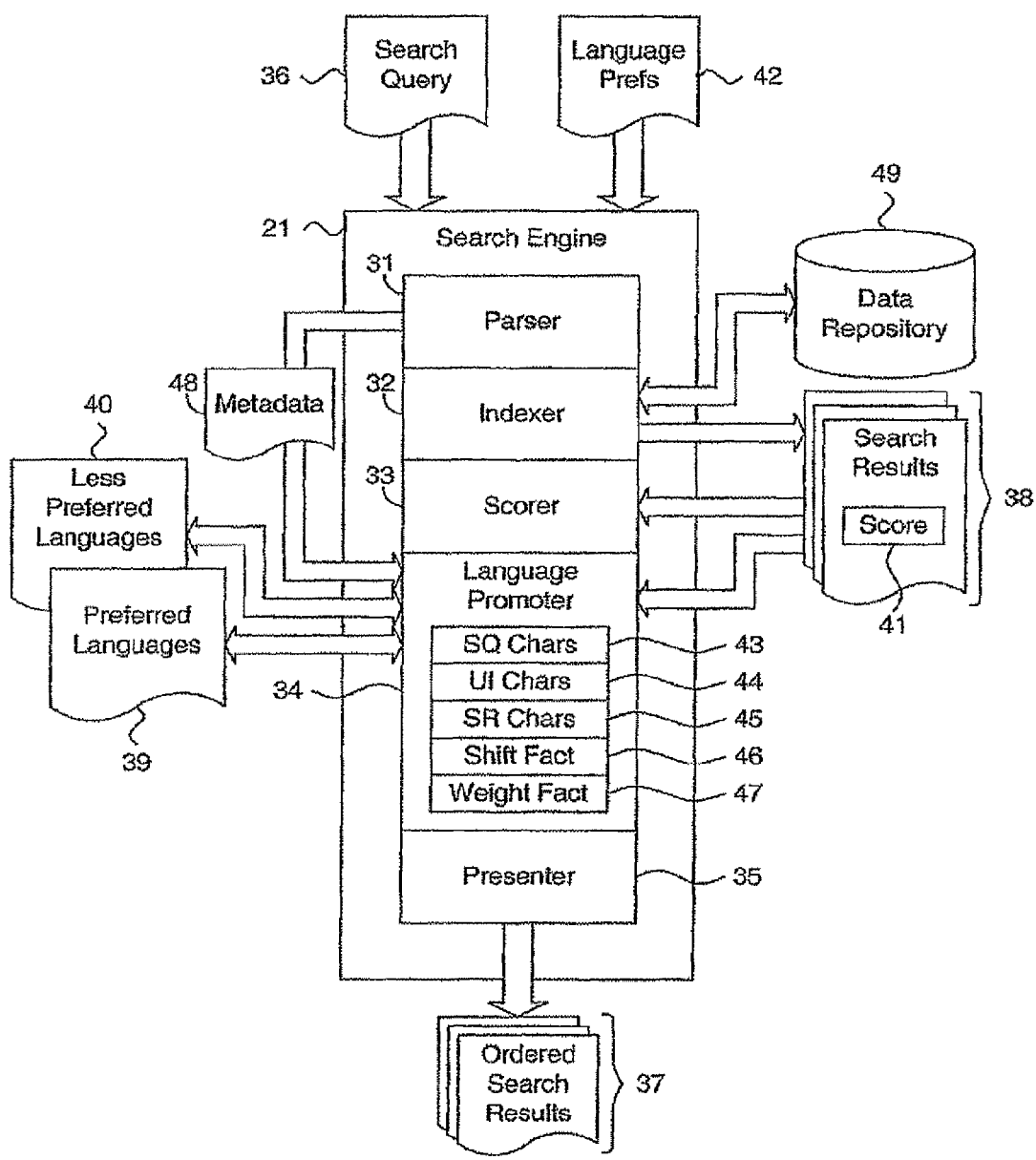
FIG. 3 is a functional block diagram showing the language component of the search engine of FIG. 2.

FIG. 3 is a functional block diagram showing the language component 1130 of the search engine 21 of FIG. 2. Each component is a computer program, procedure or process written as source code in a conventional programming language, such as the C++ programming language, and is presented for execution by one or more CPUs as object or byte code in a uniprocessing, distributed or parallelized configuration, as is known in the art. The various implementations of the source code and object and byte codes can be held on a computer-readable storage medium or embodied on a transmission medium in a carrier wave.

The search engine 21 consists of five components: parser 31, indexer 32, scorer 33, language promoter 34, and presenter 35. Briefly, the search engine 21 receives a search query 36 communicated via a browser 18 from a user 19, executes a search, generates search results 38, orders the search results 38 in consideration of language preferences, and sends the ordered search results 37. The search query 36 is preferably provided as a HTTP-compliant request message and the ordered search results 37 are preferably provided as HTTP-compliant response messages, as further described below respectively with reference to FIGS. 5 and 6, although other forms of request and response exchanges are feasible, as would be recognized by one skilled in the art.

In more detail, the parser 31 receives the search query 36. Each search query 36 describes potentially retrievable information, such as Web content 22. The parser 31 then parses the search query 36 into individual tokens. The tokens include header values constituting metadata 48, and an entity body containing the actual search query. The metadata 48 is copied to the language promoter 34.

The indexer 32 executes the search by evaluating the search query 36 against information characteristics maintained in a searchable data repository 49. The information characteristics are either the actual Web content 22 or metadata, such as hyperlinks, describing terms and attributes used to identify Web content. Other structures and organizations of a searchable data repository 49 are feasible, as would be recognized by one skilled in the art. Upon completing the search, the indexer 32 generates a set of search results 38 by applying the characteristics specified in the search query 36 to the stored information. Other structures and organizations of a searchable data repository 49 are feasible, as would be recognized by one skilled in the art.

Potentially, the indexer 32 can identify thousands or even millions of search results 38, so only a subset of the search results 38, typically between 100 to 10,000, are retained as the most promising search results 38. Targeted search results (not shown) can also be introduced, such as advertising or topical information content. The most promising search results 38 are then qualitatively ranked or scored by degree of match to the search query terms. The search results 38 can be numerically scored to reflect a relative quality or goodness of match. The scorer 33 assigns a numerical score 41 to each search result 38 for indicating a quality of match.

The language promoter 34 performs two primary functions. First, the language promoter 34 determines one or more preferred languages 39 and, optionally, one or more less preferred languages 40 for each search query 36, as further described below with reference to FIG. 8. In one embodiment, such preferred languages 39 may be determined using a language selector (not shown). Second, the language promoter 34 orders the search results 38 in consideration of the preferred languages 39 and, if available, the less preferred languages 40, as further described below with reference to FIG. 11. In one embodiment, such search results 38 may be ordered using a search result orderer (not shown). For efficiency, the language promoter 34 preferably orders a subset of the most promising search results 38, typically in the range of 15 to 30 search results, although other ranges could be used, as would be recognized by one skilled in the art.

In the described embodiment, the scorer 33 assigns those search results 38 having a higher degree of match a commensurately higher rank relative to other search results 38. For instance, if Spanish was a preferred language 39, those search results 38 in Spanish would have a higher degree of match than search results 38 in, say, English. However, those search results 38 in a less preferred language, such as Portuguese, could also have a higher degree of match than search results 38 in English, but lower degree of match than search results 38 in Spanish. Alternatively, a counter ranking approach could be used whereby the scorer 33 assigns those search results 38 having a higher degree of match a commensurately lower rank relative to other search results 38. Other styles, assignments or definitions of search result ranking are feasible, as would be recognized by one skilled in the art.

In another embodiment, the search results 38 are numerically scored to reflect a relative quality or goodness of match. The scorer 33 assigns a numerical score 41 to each search result 38 for indicating a relative quality of match, with higher numerical scores 41 to reflect better quality than lower numerical scores 41. For instance, if Spanish was a preferred language 39, those search results 38 in Spanish would have a higher numerical score 41 than search results 38 in, say, English. However, those search results 38 in a less preferred language, such as Portuguese, could also have a higher numerical score 41 than search results 38 in English, but lower numerical score 41 than search results 38 in Spanish. Alternatively, a counter scoring approach could be used whereby the scorer 33 assigns lower numerical scores 41 to reflect better quality than higher numerical scores 41. Other styles, assignments or definitions of search result scoring are feasible, as would be recognized by one skilled in the art.

To determine the preferred languages 39 and less preferred languages 40, the language promoter 34 evaluates search query characteristics (SQ Chars) 43, user interface characteristics (UI Chars) 44, and search result characteristics (SR Chars) 45. The search query characteristics 43 may be determined from the metadata 48. The user interface characteristics 44 may be determined from the metadata 48, and any available language preferences 42, which may be maintained by the server II (server-side) independently of each search query 36. The search result characteristics 45 may be determined from the search results 38.

The language promoter 34 orders the search results 38. In one embodiment, non-numerically ordered search results 38 are ordered by a shifting factor 46, as further describe below with reference to FIG. 12. In the described embodiment, a constant shifting factor 46 of two (2.0) is employed to demote search results 38 in non-preferred languages by two positions. This shifting factor 38 is suitable when search results 38 are ordered by decreasing degree of match to the search query 36. For example, a search result 38 in a non-preferred language occurring in the third position of a list of the search results 38 would be demoted to the fifth position. Other forms of shifting factors could be employed as well. For instance, the shifting factor 46 could promote search results 38 in non-preferred languages. As well, the shifting factor 46 could order the search results 38 by mathematical function, using, for example, additive, subtractive, multiplicative, fractional, divisional, and logarithmic factors, or may be a formula or function, as well as various combinations and arrangements thereof, as would be recognized by one skilled in the art.

In another embodiment, preferable when an adjustment formula is available for a range of numerical scores 41, numerically scored search results 38 are ordered by a weighting factor 47, as further describe below with reference to FIG. 13. Such weighting factor 47 may be a constant, mathematical function using, for example, additive, subtractive, multiplicative, fractional, divisional, and logarithmic factors, or may be a formula or function, as well as various combinations and arrangements thereof, as would be recognized by one skilled in the art. In the described embodiment, the numerical scores 41 increase with the quality of match. For example, a higher numerical score 41 reflects a better quality than lower numerical scores 41. Alternatively, a system may be employed whereby the numerical scores 41 could decrease with quality of match, as would be recognized by one skilled in the art. In the described embodiment, two weighting factors 47 are used to increase the numerical score 41 of each search result 38 depending upon whether the search result 38 is in one of the preferred languages 39 or the less preferred languages 40. For search results 38 in one of the preferred languages 39, a weighting factor $W_{LP}$ is provided by the equation (1):

$$w_{LP} = \left\{ \forall\, s_{1 \to n} : s_i = \frac{s_i + 1}{2} \right\} \quad (1)$$

For search results 38 in one of the less preferred languages 40, a weighting factor $W_{LPL}$ is provided by the equation (2):

$$w_{LPL} = \left\{ \forall\, s_{1 \to n} : s_i = \frac{(s_i \times 2) + 1}{3} \right\} \quad (2)$$

These weighting factors are most suitable when numerical scores 41 range between 0.0 and 1.0 and are approximately uniformly distributed. In the described embodiment, the search results 38 having a given score $s_i$ are promoted more when associated with one of the preferred languages 39 than when associated with one of the less preferred languages 40. However, the search results 38 associated with one of the less preferred languages 40 could instead be promoted more than the search results 38 associated with one of the preferred languages 39, as would be recognized by one skilled in the art. Alternatively, weighting factors 47 could be used to decrease the numerical score 41 of each search result 38 depending upon whether the search result 38 is in one of the preferred languages 39 or the less preferred languages 40. Other ranges of numerical scores and forms of weighting factors could be employed as well, as would be recognized by one skilled in the art.

In a further embodiment, the shifting factor 46 and the weighting factor 47 can be adjusted to accommodate less or more reliable dynamic preferred language determination. For instance, a short search query 36 or sparse search results 37 might lower the accuracy of the dynamic preferred language determination due to less context with which to work. The shifting factor 46 and the weighting factor 47 would be relaxed to less aggressively order the search results 37 Alternatively, a long search query 36 or lengthy search results 37 might increase the accuracy and the shifting factor 46 and the weighting factor 47 would be increased to more aggressively order the search results 37.

Finally, the presenter 35 presents the ordered search results 37 to the user 19 via the browser 18. Typically, only a part of the ordered search results 37 need be presented since the full set of ordered search results 37 can exceed available presentation space on the browser 18. Presentation is the communication of the ordered search results 37 by means of a search result response message.

Search Query Execution and Search Results Processing

Figure 4:
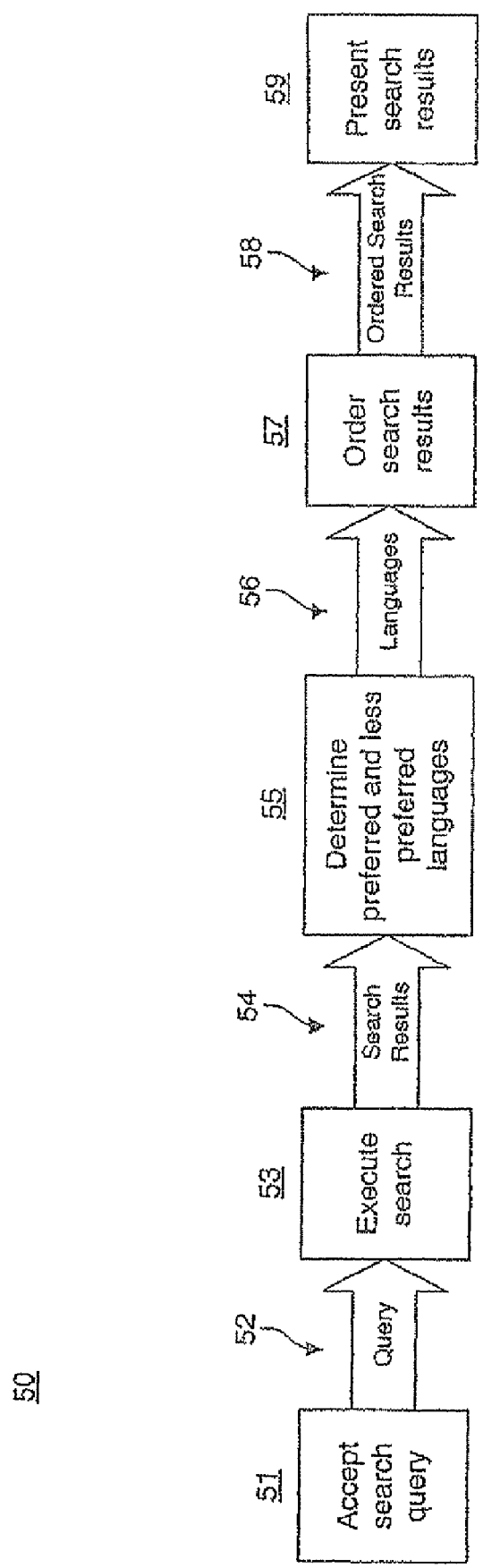
FIG. 4 is a process flow diagram showing search query execution and search results processing by the language component of the search engine of FIG. 2.

FIG. 4 is a process flow diagram 50 showing search query execution and search results processing by the language component of the search engine 21 of FIG. 2. The process flow proceeds in five primary phases. First, a search query 52 is accepted and parsed (process 51) and is forwarded to the next phase. A search is executed (process 53) against a stored data repository and search results 54 are forwarded to the next phase. The preferred and less preferred languages 56 of the user 19 are determined (process 55) based on metadata and available context. The preferred and less preferred languages 56 are forwarded to the next phase for use in ordering the search results 54 (process 57). In the final phase, the ordered search results 58 are forwarded and presented (process 59). The phases of determining the preferred and less preferred languages (process 55) and ordering the search results (process 57) enhance the quality of the search results by tailoring the search results in accordance with dynamically determined user language preferences.

Request Message Structure

Figures 5, 6:
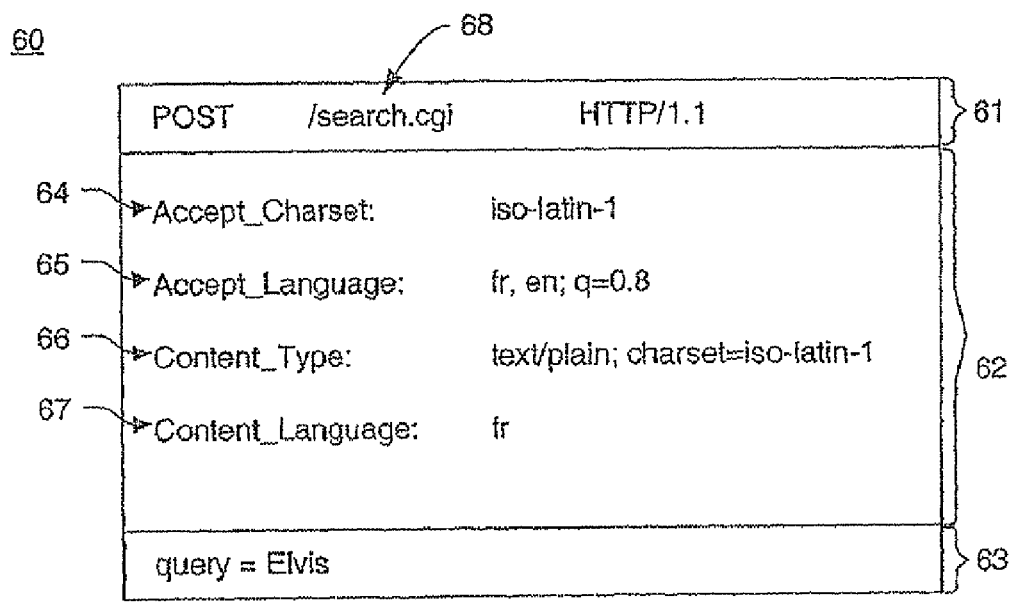
FIG. 5 is a data structure diagram showing, by way of example, a request message for receipt by the language component of the search engine of FIG. 2.
FIG. 6 is a data structure diagram showing, by way of example, a response message for dispatch by the language component of the search engine of FIG. 2.

FIG. 5 is a data structure diagram showing, by way of example, a request message 60 for receipt by the language component of the search engine 21 of FIG. 2. The request message 60 is an HTTP-compliant request message, such as described in D. Gourley and E. Totty, "HTTP, the Definitive Guide," Ch. 3, pp. 43-73, O'Reilly and Assocs., Sebastopol, Calif. (2002), the disclosure of which is incorporated by reference. The request message 60 consists of three parts: start line 61, headers 62, and entity body 63. The start line 61 identifies an HTTP method, such as, "POST," which sends input data from the browser 18 to the search engine 21. The start line 61 also includes a request Uniform Resource Locator (URL) 68 and HTTP version identifier. The exemplary request URL, "/search.cgi," identifies a search request.

The headers 62 consist of zero or more MIME-compliant name and value pairings, which provide the metadata 48 describing the characteristics of the interface of the browser 18 and the entity body 63, that is, the search query itself. Four MIME-compliant headers provide metadata 48 instrumental in determining those languages acceptable to a requesting user, as follows:

(1) Accept_Charset (64): Indicates the character sets that are acceptable or preferred by the requesting browser 18, for instance, ISO-Latin-1, an eight-bit extension to ASCII that supports Western European languages. ISO-Latin-1 is also known as ISO-8859-1.

(2) Accept_Language (65): Indicates the languages that are acceptable or preferred by the user 19, in order of preference and optionally including a quality factor q, for instance, strong preference for French (fr) and lesser preference for English (en).

(3) Content_Type (66): Describes the media type of the entity body 63, for instance, plain text (text/plain) and can indicate the character sets used to encode the entity body 63, for instance, ISO-Latin-1, as a parameter.

(4) Content_Language (67): Indicates the natural language in which the entity body 63 is expressed, for instance, French (fr).

Other forms of request message formats using equivalent or related protocols and providing similar information as the forgoing headers 62, as well as other headers and parameters, are feasible, as would be recognized by one skilled in the art.

Response Message Structure

FIG. 6 is a data structure diagram showing, by way of example, a response message 70 for dispatch by the language component of the search engine 21 of FIG. 2. The response message 70 is an HTTP-compliant response message, such as described in D. Gourley and E. Totty, Id., the disclosure of which is incorporated by reference. The response message 70 also consists of three parts: start line 71, headers 72, and entity body 73. The start line 71 includes an HTTP identifier, response status code, and human-readable reason phrase.

The headers 72 consist of zero or more MIME-compliant name and value pairings, which provide the metadata describing the characteristics of the entity body 73, that is, each search result. Two MIME-compliant headers provide metadata instrumental in determining those languages acceptable to a requesting user, as follows:

(1) Content_Type (74): Describes the media type of the entity body 73, for instance, plain text (text/plain) and indicates the character sets used to encode the entity body 73, for instance, ISO-Latin-1, as a parameter.

(2) Content_Language (75): Indicates the natural language in which the entity body 73 is expressed, for instance, English (en).

Other forms of response message formats using equivalent or related protocols and providing similar information as the forgoing headers 72, as well as other headers and parameters, are feasible, as would be recognized by one skilled in the art.

Method Overview

Figure 7:
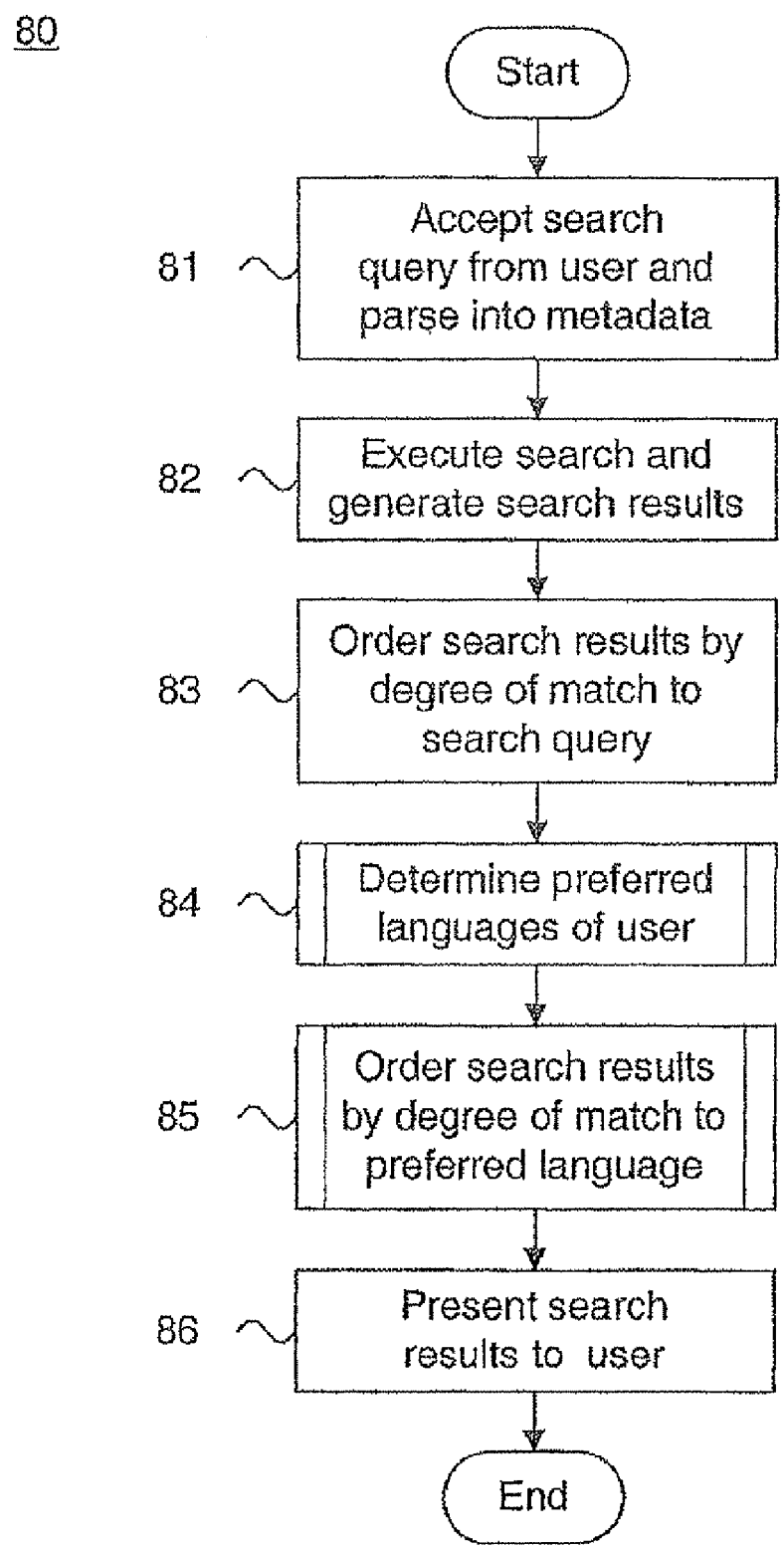
FIG. 7 is a flow diagram showing a method for providing preferred language ordering of search results, in accordance with the present invention.

FIG. 7 is a flow diagram showing a method 80 for providing preferred language ordering of search results 38, in accordance with the present invention. The method 80 is described as a sequence of process operations or steps, which can be executed, for instance, by the language component of the search engine 21 (shown in FIG. 2).

A search query 36 is accepted from a user 19 and parsed into metadata 48 (block 81). A search is executed on a searchable data repository 49 by evaluating the search query 36 against information characteristics maintained in the searchable data repository 49 and search results 38 are generated (block 82). Since thousands or even millions of search results 38 can potentially be generated, only a subset of the search results 38, typically between 100 to 10,000, are retained as the most promising search results 38. Targeted search results (not shown) can also be introduced, such as advertising or topical information content. Prior to providing the search results 38 to the browser 18, the search results 38 can be temporarily staged as "raw" Web pages, structured data, or unstructured data, from which metadata describing the characteristics of each search result 38 can be extracted, as is known in the art. The search results 38 are qualitatively ordered by degree of match to the search query 36 (block 83) to provide a ranking or scoring, including a numerical score 41, reflecting search result quality, as described above with reference to FIG. 3.

Up to this point, the search results 38 have been identified and ranked or scored. The preferred languages 39, as well as the less preferred languages 40, of the requesting user 19 are then determined (block 84), as further described below with reference to FIG. 8. The search results 38 are then ordered by degree of match to the preferred languages 39 and, if identified, less preferred languages 40 (block 85), as further described below with reference to FIG. 11. For efficiency, preferably only a subset of the most promising search results 38, typically in the range of 15 to 30 search results, are ordered, although other ranges could be used, as would be recognized by one skilled in the art. Finally, the ordered search results 37 are presented via the browser 18. Typically, only a part of the ordered search results 37 need be presented since the full set of ordered search results 37 can exceed available presentation space on the browser 18. In the described embodiment, the search query 36 is provided as an HTTP-compliant request message 60 and each search result is provided back to the user 19 as an HTTP-compliant response message 70.

In a further embodiment, the preferred languages 39 and less preferred languages 40 are stored for future use while executing search queries 36 from the same requesting user 19. As well, the ability to present the ordered search results 37 using preferred language ordering could be controlled by enabling or disabling presentation in the preferred languages 39 and, if available, the less preferred languages 40, using a "toggle" provided via the user interface. In a still further embodiment, the ordered search results 37 are grouped together in each of the preferred languages 39 and, if available, the less preferred languages 40, prior to presentation to the requesting user 19. Alternatively, the ordered search results 37 in the preferred languages 39 and, if available, the less preferred languages 40 can be arranged for presentation next to those search results in non-preferred languages, such as by using adjacent columns or cells in a table. The routine then terminates.

Determining Preferred Languages

Figure 8:
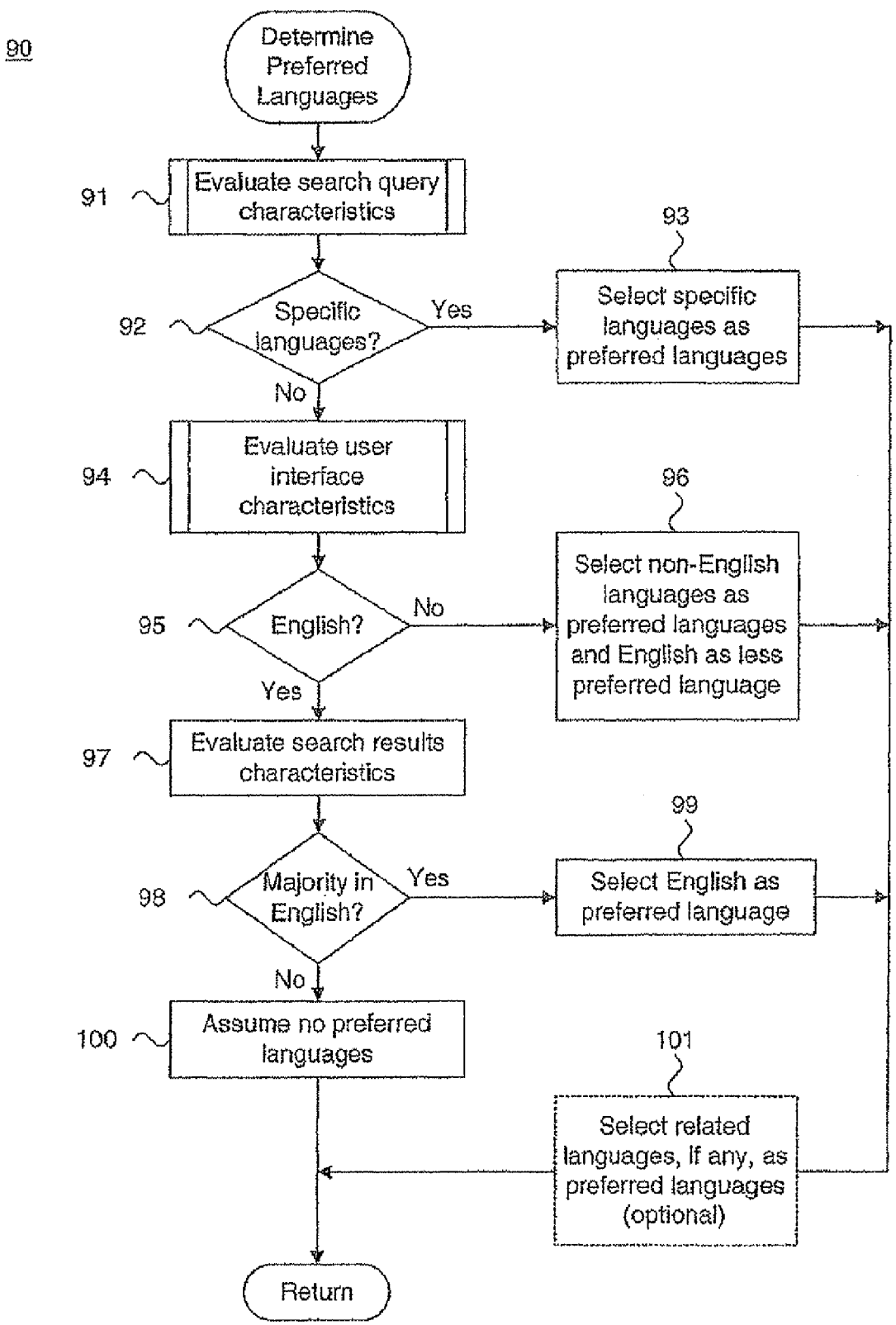
FIG. 8 is a flow diagram showing the routine for determining preferred languages for use in the method of FIG. 7.

FIG. 8 is a flow diagram showing the routine 90 for determining preferred languages 39 for use in the method 80 of FIG. 7. The purpose of this routine is to determine the preferred languages 39 and any less preferred languages 40 of the requesting user 19 based on search query characteristics 43, user interface characteristics 44, and search result characteristics 45.

First, the search query characteristics 43 are evaluated (block 91) based on the metadata 48 parsed from the search query 36, as further described below with reference to FIG. 9. If specific languages can be determined based on the search query characteristics 43 (block 92), the specific languages are selected as the preferred languages 39 (block 93).

Next, if no specific languages can be determined from the search query characteristics 43 (block 92), the user interface characteristics 44 are evaluated (block 94), as further described below with reference to FIG. 10. If the user interface does not define English as an accepted language (block 95), each non-English language is selected as a preferred language 39 and English is selected as a less preferred language 40 (block 96).

Next, if English is provided as the accepted language of the user interface (block 95), the search results characteristics 45 are evaluated (block 97). In the described embodiment, the search results 38 are provided in one of two formats. First, the search results 38 can be grouped as a collection of "raw" Web pages from which language characteristics can be determined. Second, the search results 38 can be organized into metadata describing the various characteristics, including language characteristics, and content of the Web pages corresponding to the search results 38. The predominant language of each search result 38 can be dynamically determined through content analysis, such as described in U.S. Pat. No. 6,167,369, issued Dec. 26, 2000 to Schulze, the disclosure of which is incorporated by reference. If a majority of the search results 38 are in English (block 98), English is selected as a preferred language 39 (block 99). Otherwise, no preferred languages 39 or less preferred languages 40 are assumed (block 100) and the routine returns.

For each instance in which one or more preferred language 39 has been selected (blocks 93, 96 and 99), related languages, if any, can optionally be selected as additional preferred languages 39 (block 101). Related language include those languages and dialects sharing a common basis whereby users proficient in one such language are able to comprehend, perhaps with only slight difficulty, related languages. For instance, a user proficient in Spanish can often comprehend information provided in Portuguese. Following any additions to the preferred languages 39, the routine returns.

Evaluating Search Query Characteristics

Figure 9:
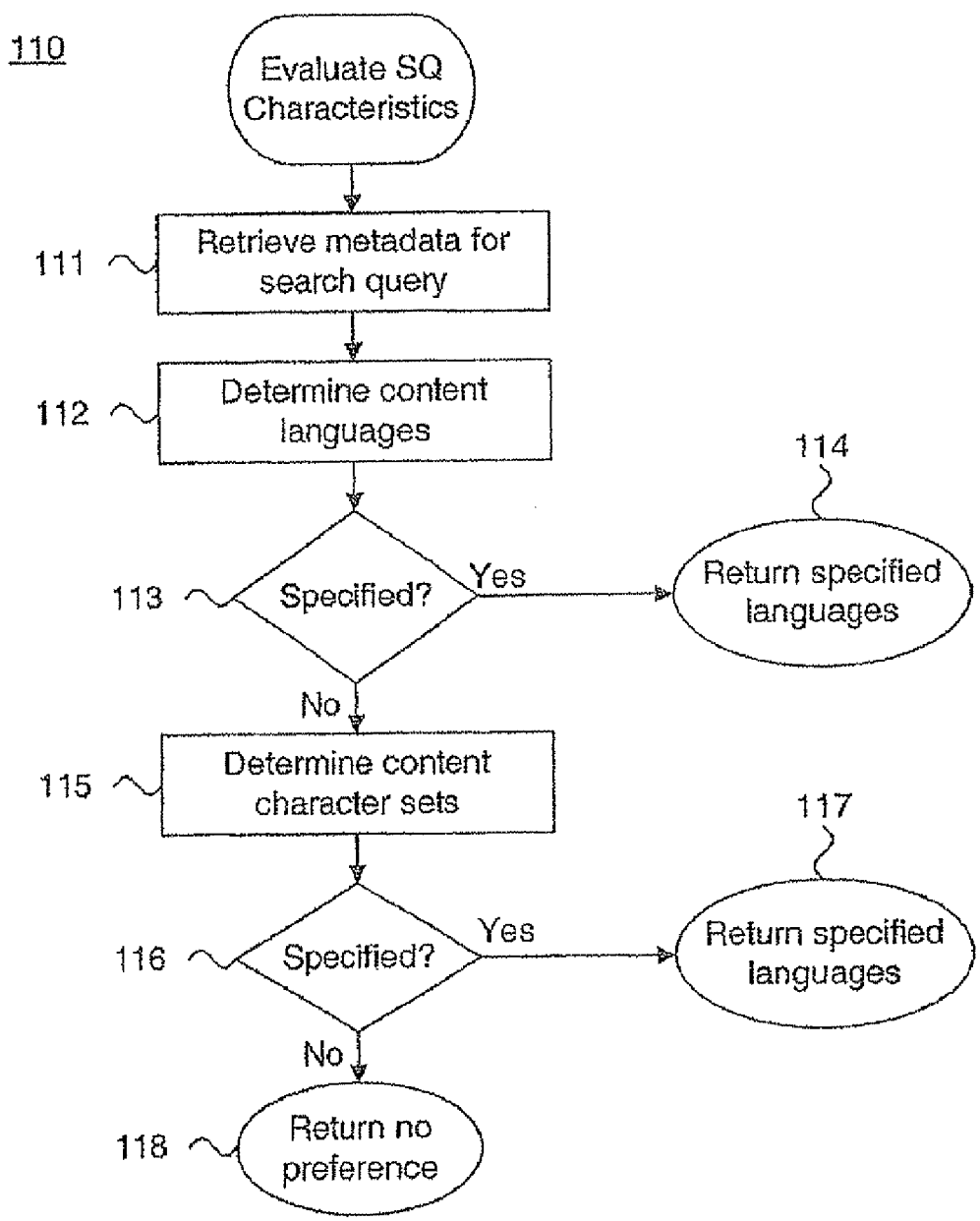
FIG. 9 is a flow diagram showing the function for evaluating search query characteristics for use in the routine of FIG. 8.

FIG. 9 is a flow diagram showing the function 110 for evaluating search query characteristics 43 for use in the routine 90 of FIG. 8. The purpose of this function is to determine any preferred languages 39 based on available metadata 48 parsed from the headers 62 of the search query request message 60.

First, any available metadata 48 corresponding to the headers 62 of the search query request message 60 are retrieved (block 111). The languages of the content provided in the entity body 63 are determined (block 112) by evaluating the parameters of the Content_Language header 67. If specified (block 113), the specified languages are returned (block 114). Otherwise, the character sets of the content provided in the entity body 63 are determined (block 115) by evaluating the Content_Type header 66. If specified as language-specific character sets (block 116), the specified languages are returned (block 117). For example, the ISO-2022-JP is a Japanese-specific character set. Otherwise, no language preferences are returned (block 118).

Evaluating User Interface Characteristics

Figure 10:
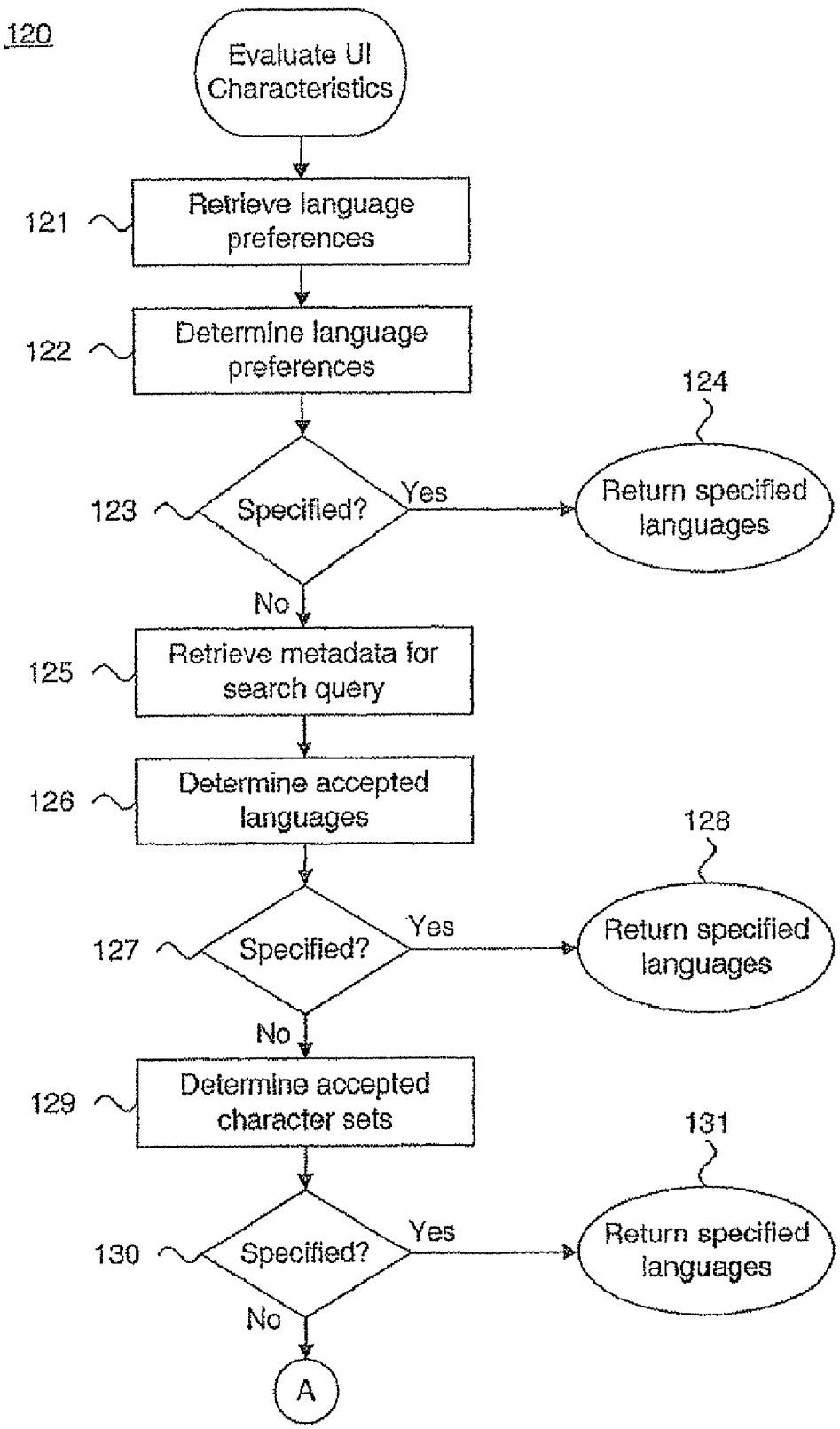
FIG. 10 is a flow diagram showing the function for evaluating user interface characteristics for use in the routine of FIG. 8.
Figure 10:
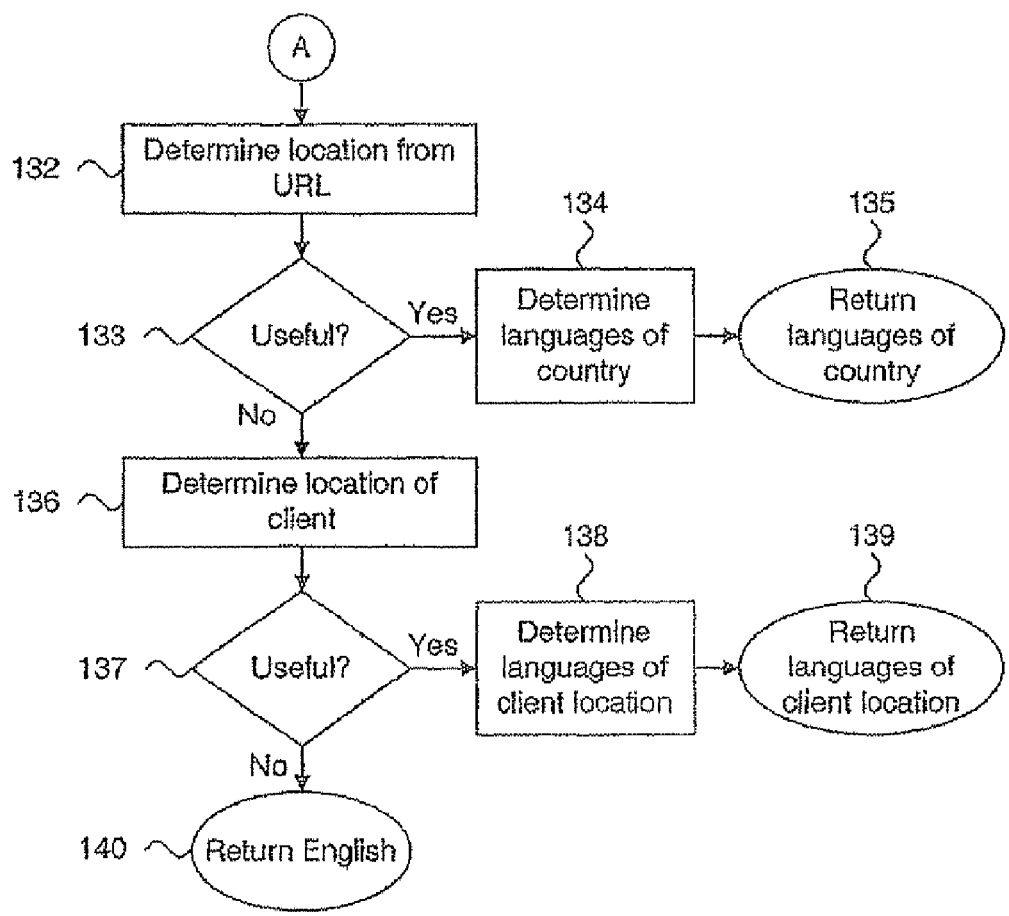

FIG. 10 is a flow diagram showing the function 120 for evaluating user interface characteristics 44 for use in the routine 90 of FIG. 8. The purpose of this function is to determine any preferred languages 40 based on user interface characteristics.

The user interface is generated by the search engine 21 and express language preferences can often be specified as user options. Thus, any available language preferences are first retrieved (block 122). Server-side language preferences are maintained either directly in a cookie stored at the client, or by the search engine 21 and accessed using cookies or log-in procedures to uniquely identify each requesting user 19. If available, the appropriate language identifying cookie is retrieved, or the appropriate user log-in procedure is performed. The stored language preference are retrieved and used to determine any server-side language preferences (block 122). If specified (block 123), the specified languages are returned (block 124).

Browsers 18 can limit the languages in which search results 38 are accepted as client-side language preferences. Thus, any available metadata 48 corresponding to the headers 62 of a search query request message 60 are retrieved (block 125) and the languages accepted by the user interface of the browser 18 are determined (block 126) by evaluating the Accept_Language header 65. In addition to specifying accepted languages, the Accept_Language header 65 can include a quality factor q that indicates a degree of language preference on a scale of 0.0 through 1.0. If specified (block 127), the specified languages are returned (block 120) with those languages having a quality factor q less than 1.0 being specified as less preferred languages 40.

If no accepted languages for the user interface of the browser 18 are specified (block 127), the character sets accepted by the user interface of the browser 18 are determined (block 128) by evaluating the Accept_Charset header 64. If specified as language-specific character sets (block 130), the specified languages are returned (block 131).

Otherwise, no language preferences can be determined by either server-side or client-side language preferences. However, a language preference might still be determinable based on information available in the URL 68 and the client location. The location of the IP domain identified in the URL 68 is determined (block 132). For example, a URL 68 specified as "www.acme.at" has an IP domain of ".at," which indicates an Austrian IP domain. However, certain IP domains, such as ".com," are so widely-used that no useful language preference inferences can be drawn. If the URL 68 provides a useful IP domain (block 133), the languages of the country to which the IP domain is assigned is determined (block 134) and returned (135). If not useful (block 133), the location of the client 12 from which the search query 36 was sent is determined (block 136) by evaluating a Client_IP parameter, which can be parsed from the header of the Transmission Control Protocol (TCP) packet within which the search query 36 was sent. The Client_IP parameter provides an IP address, which is a 32-bit numeric address written as four numbers separated by periods. An IP domain can be determined by a Domain Name Service lookup of the last number in the IP address. Again, if useful in inferring a language preference (block 137), the languages of the IP domain are determined (block 138) and returned (block 139). In the described embodiment, the predominant language for the domain specified in the IP address of the client 12 is selected. Otherwise, if no IP address is provided (block 137), English is returned (block 140).

Ordering Search Results

Figure 11:
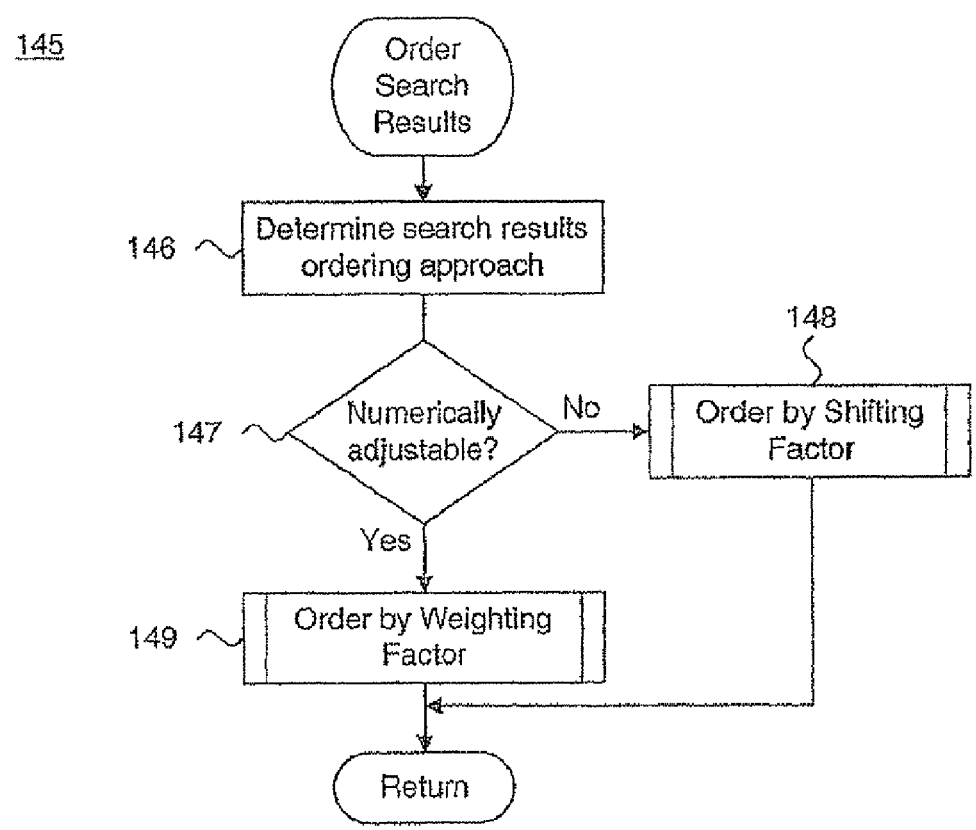
FIG. 11 is a flow diagram showing the routine for ordering search results for use in the method of FIG. 7.

FIG. 11 is a flow diagram showing the routine 145 for ordering search results 38 for use in the method 80 of FIG. 7. The purpose of this routine is to order the search results 38 based on the ranking or ordering method used, if any, by the search engine 21 in consideration of the preferred languages 39 and, if available, the less preferred languages 40.

First, the approach utilized by the search engine 21 to rank or order the search results 38 is determined (block 146). If the numerical scores 41 assigned to the search results 38 are suitable for numerical adjustment (block 147), a numerical scoring approach is utilized, whereby the search results 38 are ordered using a weighting factor 47 (block 149), as further described below with reference to FIG. 13. Otherwise, the search results 38 are ordered by using a shifting factor 26 (block 148), as further described below with reference to FIG. 12. The routine then returns.

Ordering Search Results by a Shifting Factor

Figure 12:
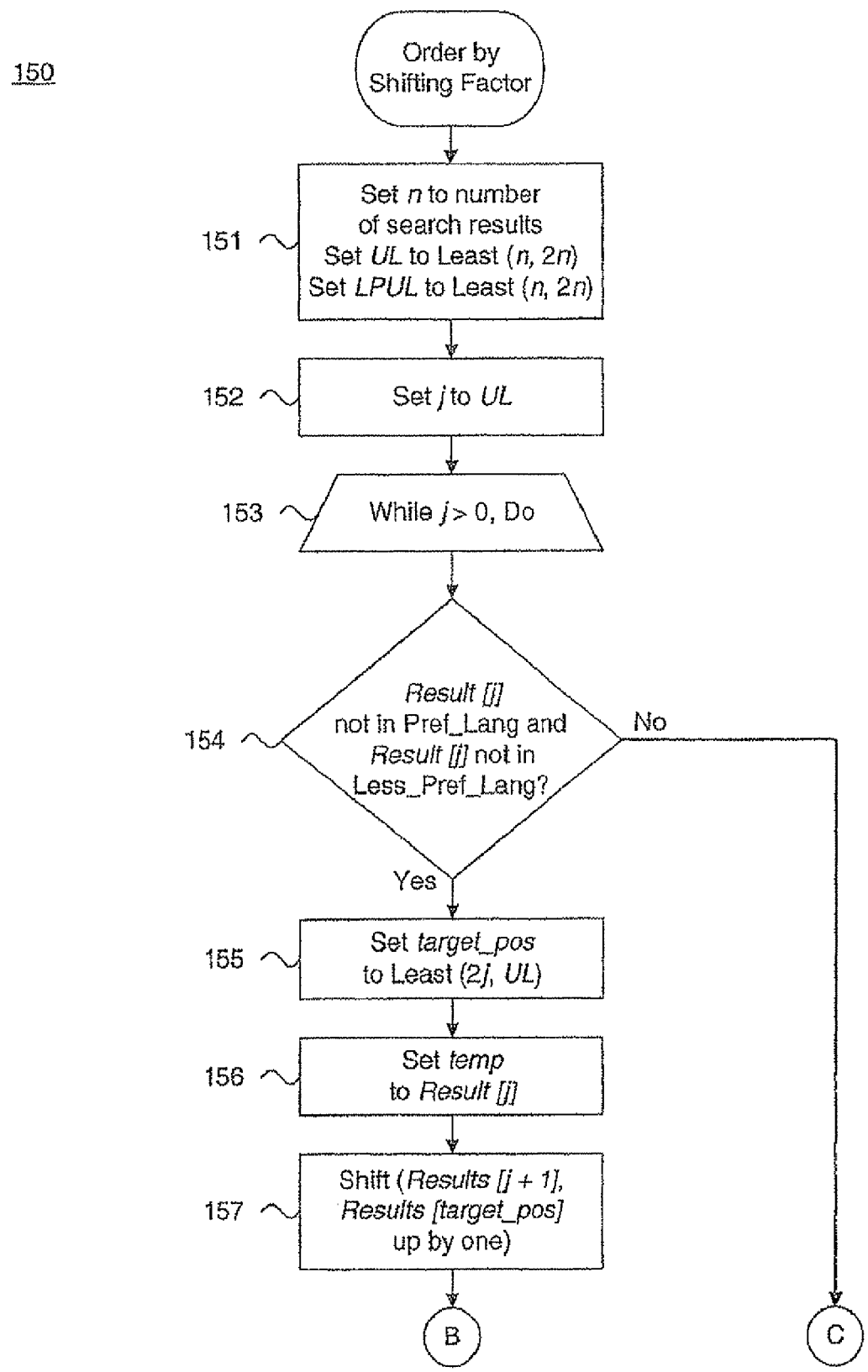
FIG. 12 is a flow diagram showing the routine for ordering search results by a shifting factor for use in the routine of FIG. 11.
Figure 12:
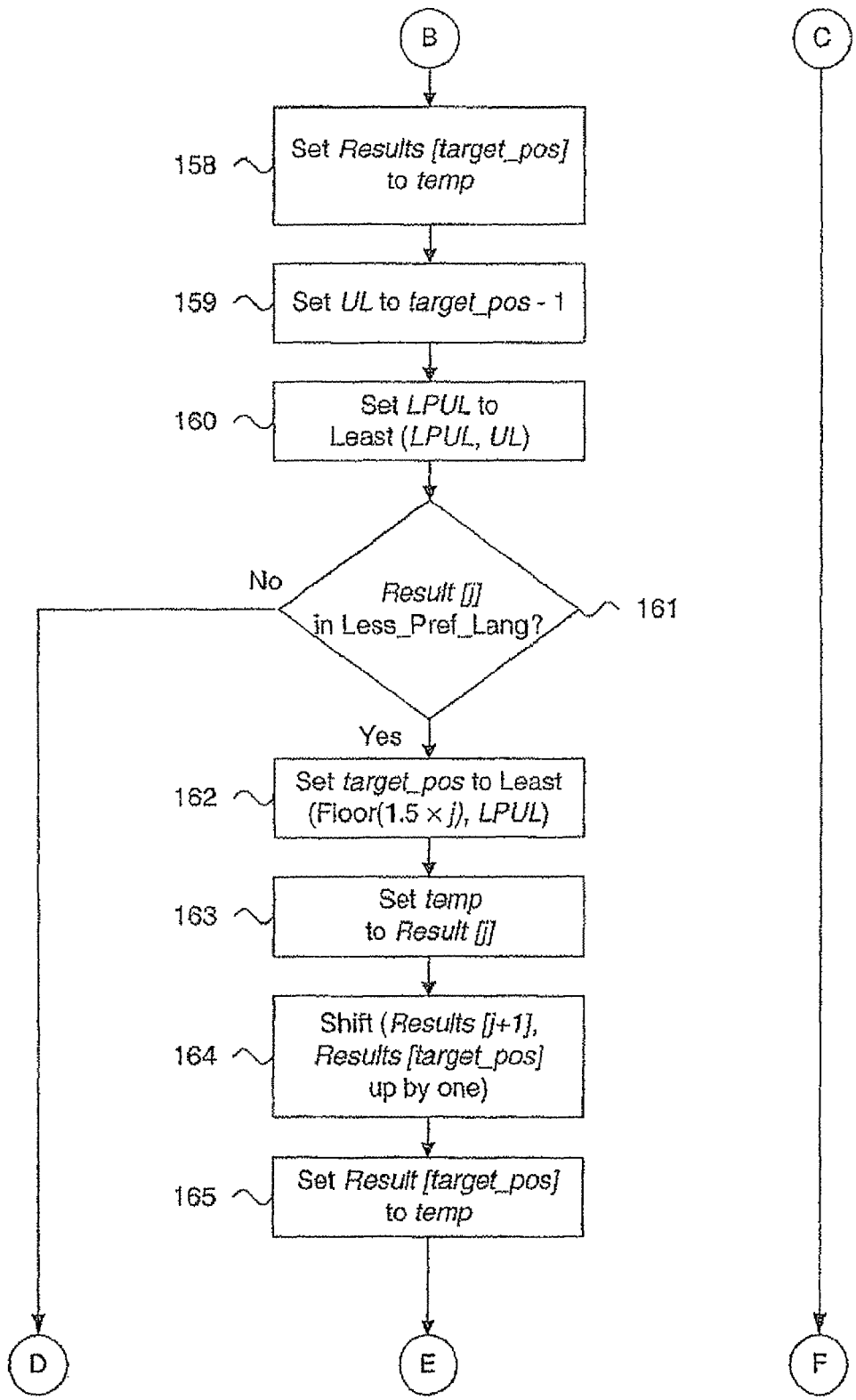
Figure 12:
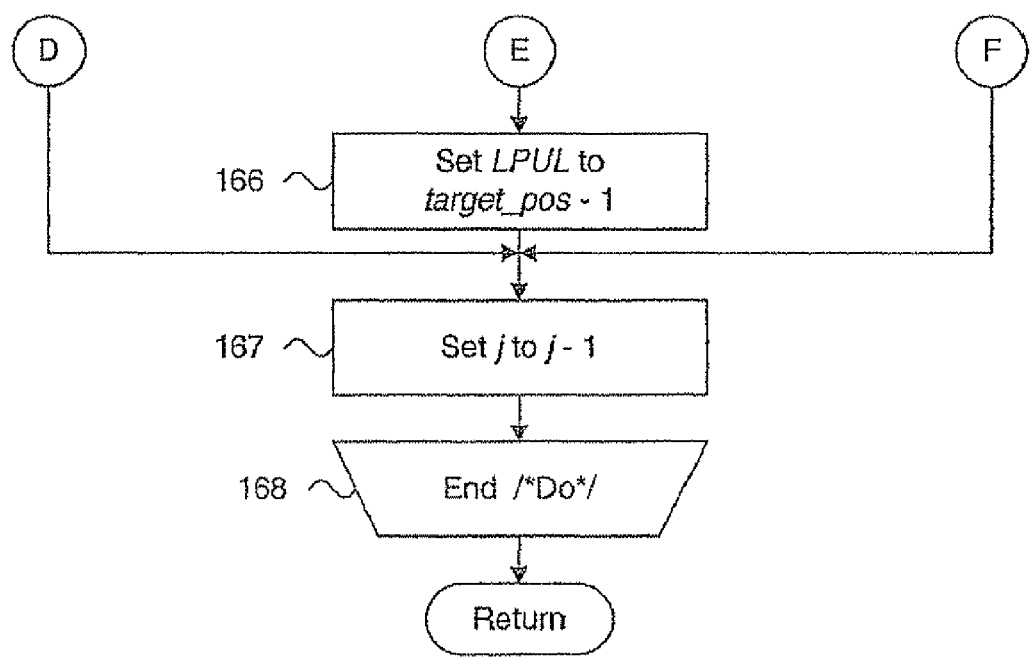

FIG. 12 is a flow diagram showing the routine 150 for ordering search results 38 by a shifting factor 46 for use in the routine 130 of FIG. 10. The purpose of this routine is to shift search results 38 in a non-preferred language down in relation to search results 38 in a preferred language 39 or less preferred language 40. In the described embodiment, a constant shifting factor 46 of two (2.0) is employed to demote search results 38 in non-preferred languages by two positions. This shifting factor 38 is suitable when search results 38 are ordered by decreasing degree of match to the search query 36. For example, a search result 38 in a non-preferred language occurring in the third position of a list of the search results 38 would be demoted to the fifth position. Other forms of shifting factors could be employed as well. For instance, the shifting factor 46 could promote search results 38 in non-preferred languages. As well, the shifting factor 46 could order the search results 38 by mathematical functions, including additive, subtractive, multiplicative, fractional, divisional, and logarithmic factors, as well as various combinations and arrangements thereof, as would be recognized by one skilled in the art.

In one embodiment, the routine operates on a subset less than or equal to the total number of search results 38, although other forms of subset selection criteria could be used, as would be recognized by one skilled in the art. A variable n is set to the number of search results to be displayed to the user 19, while an upper limit UL for preferred language 39 and an upper limit for less preferred languages LPUL are both set to the lesser of the number of search results 38, n, and twice n (block 151). The search results 38 are then ordered in an iterative processing loop (blocks 153-166) as follows. First, an index j is set to the upper limit UL (block 152) and processing is performed while the index j is positive (block 153). The search results are maintained in an array Result[ ]. If Result [j] is not in a preferred language Pref_Lang and Result [j] is not in a less preferred language Less_Pref_Lang (block 154), Result [j] is demoted by the shifting factor 46, as follows. A variable target_pos is set to the lesser of twice j and upper limit UL (block 155) and a temporary variable, temp, is set to Result [j] (block 156). The remaining search results 38 are promoted by shifting Results [j+1] through Results [target_pos] up by one (block 157) and Result [target_pos] is set to temp (block 158). The upper limit UL is set to target_pos minus one (block 159) and the less preferred upper limit LPUL is set to the lesser of the less preferred upper limit LPUL and upper limit UL (block 160).

If Result [j] is in a less preferred language Less_Pref Lang (block 161), Result [j] is demoted by the shifting factor 46, as follows. The variable target_pos is set to the lesser of the floor of 1.5 times j and the less preferred upper limit LPUL (block 162) and a temporary variable, temp, is set to Result [j] (block 163). The remaining search results 38 are shifted by promoted Results [j+1] through Results [target_pos] up by one (block 164) and Result [target_pos] is set to temp (block 165). The less preferred upper limit (LPUL) is set to target_pos minus one (block 166).

Finally, the index j is set to j minus one (block 167) and processing continues with the next loop iteration (block 168), after which the routine returns.

Ordering Search Results by a Weighting Factor

Figure 13:
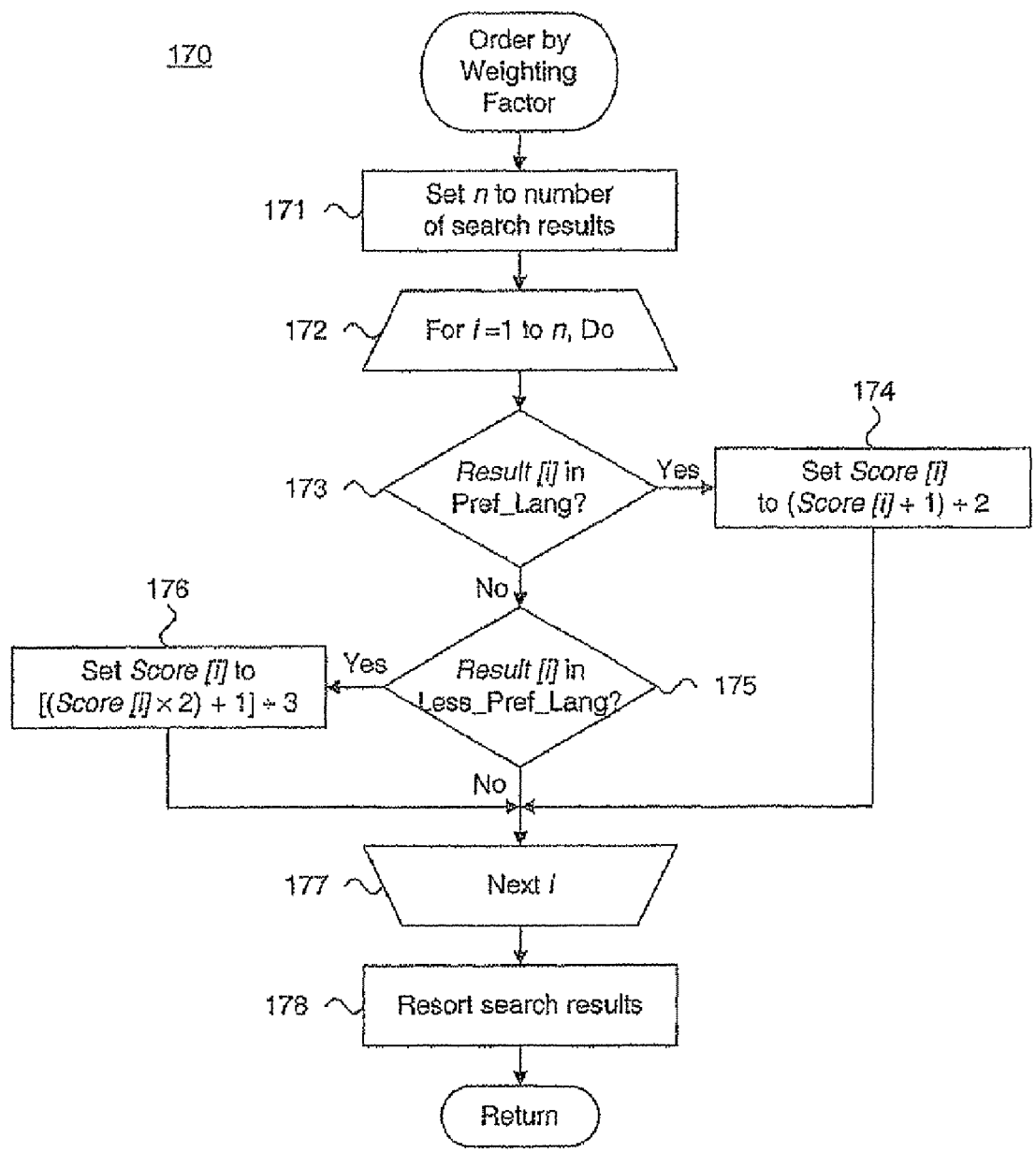
FIG. 13 is a flow diagram showing the routine for ordering search results by a weighting factor for use in the routine of FIG. 1.

FIG. 13 is a flow diagram showing the routine 170 for ordering search results 38 by a weighting factor 47 for use in the routine 130 of FIG. 10. The purpose of this routine is to order the search results 38 by recalculating the numerical score 41 assigned to each search result 38 to favor those search results in either one of the preferred languages 39 or less preferred languages 40. On one embodiment, the routine operates on a subset less than or equal to the number of search results 38, which equals the number of search results 38 to be displayed to the user multiplied by a margin, for instance, 2 or 3, although other forms of subset selection criteria could be used, as would be recognized by one skilled in the art.

In the described embodiment, the numerical scores 41 increase with the quality of match. For example, a higher numerical score 41 reflects a better quality than lower numerical scores 41. Alternatively, a system may be employed whereby the numerical scores 41 could decrease with quality of match, as would be recognized by one skilled in the art. In the described embodiment, two weighting factors 47 are used to increase the numerical score 41 of each search result 38 depending upon whether the search result 38 is in one of the preferred languages 39 or the less preferred languages 40. For search results 38 in one of the preferred languages 39, a weighting factor $W_{LP}$ is provided by the equation (3):

$$w_{LP} = \left\{ \forall \, s_{1 \to n} : s_i = \frac{s_i + 1}{2} \right\} \tag{3}$$

For search results 38 in one of the less preferred languages 40, a weighting factor $W_{LPL}$ is provided by the equation (4):

$$w_{LPL} = \left\{ \forall \, s_{1 \to n} : s_i = \frac{(s_i \times 2) + 1}{3} \right\} \tag{4}$$

These weighting factors are most suitable when numerical scores 41 range between 0.0 and 1.0 and are approximately uniformly distributed. In the described embodiment, the search results 38 having a given score $s_i$ are promoted more when associated with one of the preferred languages 39 than when associated with one of the less preferred languages 40. However, the search results 38 associated with one of the less preferred languages 40 could instead be promoted more than the search results 38 associated with one of the preferred languages 39, as would be recognized by one skilled in the art. Alternatively, weighting factors 47 could be used to decrease the numerical score 41 of each search result 38 depending upon whether the search result 38 is in one of the preferred languages 39 or the less preferred languages 40. Other ranges of numerical scores and forms of weighting factors could be employed as well, as would be recognized by one skilled in the art.

The routine operates on a subset less than or equal to the total number of search results 38 and recalculates the numerical scores 41 through an iterative processing loop (blocks 172-177) as follows. A variable n is set to the number of search results to be multiplied by a margin, for instance 2 or 3 (block 171). The search results 38 are maintained in an array Results[ ]. The numerical score 41 for each search result 38 is recalculated in the iterative processing loop (blocks 172-177) indexed by a variable i. During each iteration (block 172), if Result [i] is in a preferred language Pref_Lang (block 173), Score [i] is set to half the quantity Score[i] plus one (block 167), that is, Equation (3). Otherwise, if Result [i] is in a less preferred language Less_Pref_Lang (block 175), Score[i] is set to one-third the quantity two times Score[i] plus one (block 176), that is, Equation (4). Otherwise, no numerical score adjustment is required. Processing continues with the next iteration (block 177). After all iterations, the search results 38 are resorted (block 178), after which the routine returns.

Country Implementation

Figure 14:
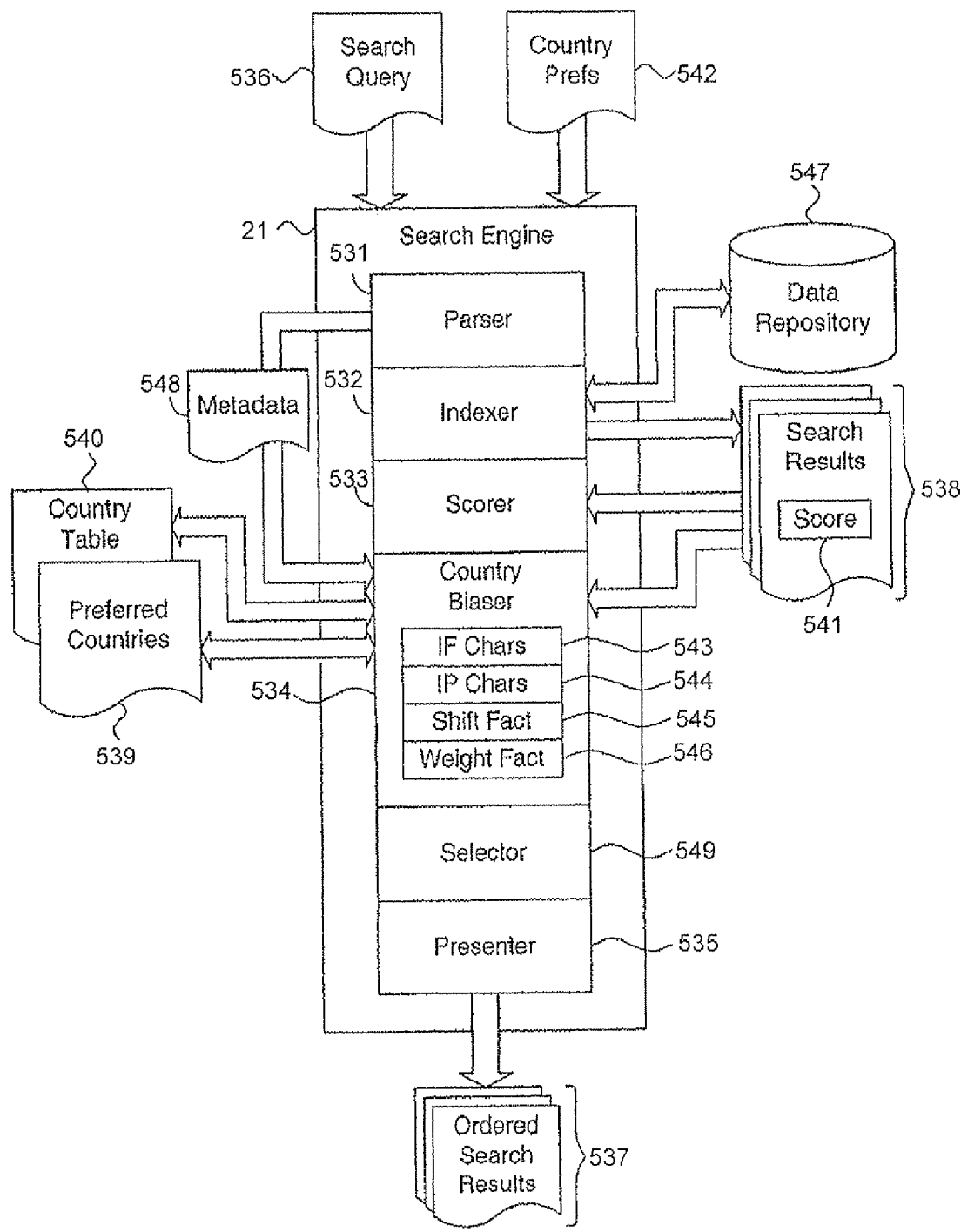
FIG. 14 is a functional block diagram showing the country component of the search engine of FIG. 2.

FIG. 14 is a functional block diagram showing the country component 1140 of the search engine 21 of FIG. 2. Each component is a computer program, procedure or process written as source code in a conventional programming country, such as the C++ programming country, and is presented for execution by one or more CPUs as object or byte code in a uniprocessing, distributed or parallelized configuration, as is known in the art. The various implementations of the source code and object and byte codes can be held on a computer-readable storage medium or embodied on a transmission medium in a carrier wave.

The search engine 21 consists of five components: parser 531, indexer 532, scorer 533, country biaser 534, and presenter 535. Briefly, the search engine 21 receives a search query 536 communicated via a browser 18 from a user 19, executes a search, generates search results 538, orders the search results 538 in consideration of country preferences, and sends the ordered search results 537. The search query 536 is preferably provided as a HTTP-compliant request message and the ordered search results 537 are preferably provided as HTTP-compliant response messages, although other forms of request and response exchanges are feasible, as would be recognized by one skilled in the art.

In more detail, the parser 531 receives the search query 536. Each search query 536 describes potentially retrievable information, such as Web content 22. The parser 531 then parses the search query 536 into individual tokens. The tokens include header values constituting metadata 548, and an entity body containing the actual search query. The metadata 548 is copied to the country biaser 534.

The indexer 532 executes the search by evaluating the search query 536 against information characteristics maintained in a searchable data repository 547. The information characteristics are either the actual Web content 22 or metadata, such as hyperlinks, describing terms and attributes used to identify Web content. Other structures and organizations of a searchable data repository 547 are feasible, as would be recognized by one skilled in the art. Upon completing the search, the indexer 532 generates a set of search results 538 by applying the characteristics specified in the search query 536 to the stored information. Other structures and organizations of a searchable data repository 547 are feasible, as would be recognized by one skilled in the art.

Potentially, the indexer 532 can identify thousands or even millions of search results 538, so only a subset of the search results 538, typically between 100 to 10,000, are retained as the most promising search results 538. The most promising search results 538 are then qualitatively ranked or scored by degree of match to the search query terms. The search results 538 can be numerically scored to reflect a relative quality or goodness of match. The scorer 533 assigns a numerical score 541 to each search result 538 for indicating a quality of match.

The indexer 532 also detects the countries associated with each search result 538. The country can be determined in several ways. First, the country can be determined from the extension of the Uniform Resource Locator (URL) of each search result 538. For instance, the URL www.whsmith.co.uk is assumed to be either located in or associated with the United Kingdom. Second, the address of the domain registrar can be examined and the country of business inferred. Similarly, the country can be inferred from the IP address of the Web server from which the search result 538 was obtained, from the search result document, or from other Web pages on the same Web site. Finally, the anchor text of the hyperlinks to the search result document, the text near the hyperlinks, or the countries of the Web pages with hyperlinks to the search result documents can be examined. Preferably, a combination of the foregoing methods can be combined to provide more accurate results. In addition, other techniques for detecting the countries associated with search results are possible, as would be recognized by one skilled in the art.

The country biaser 534 performs two primary functions. First, the country biaser 534 determines one or more preferred countries 539 for each search query 536, as further described below with reference to FIG. 17. In one embodiment, such preferred countries 539 may be determined using a country selector 549. Second, the country biaser 534 orders the search results 538 in consideration of the preferred countries 539, as further described below with reference to FIG. 20. In one embodiment, such search results 538 may be ordered using a search result orderer (not shown). For efficiency, the country biaser 534 preferably orders a subset of the most promising search results 538, typically in the range of 15 to 30 search results, although other ranges could be used, as would be recognized by one skilled in the art.

In the described embodiment, the scorer 533 assigns those search results 538 having a higher degree of match a commensurately higher rank relative to other search results 538. For instance, if Canada was a preferred country 539, those search results 538 originating from Canadian Web servers would have a higher degree of match than search results 538 from, say, Australian Web servers. However, those search results 538 from an alternate preferred country, such as the United States, could also have a higher degree of match than search results 538 from Australian Web servers, but lower degree of match than search results 538 from Canadian Web servers. Alternatively, a counter ranking approach could be used whereby the scorer 533 assigns those search results 538 having a higher degree of match a commensurately lower rank relative to other search results 538. Other styles, assignments or definitions of search result ranking are feasible, as would be recognized by one skilled in the art. As well, the Web servers for a preferred country need not be physically located within the borders of the country and only need present a reasonable nexus to a given country with respect to Web content and logical association, as would be recognized by one skilled in the art.

In another embodiment, the search results 538 are numerically scored to reflect a relative quality or goodness of match. The scorer 533 assigns a numerical score 541 to each search result 538 for indicating a relative quality of match, with higher numerical scores 541 to reflect better quality than lower numerical scores 541. Those numerical scores 541 assigned to search results 538 from a Web server associated with a preferred country are promoted or "boosted" to provide a preferred country bias. For instance, if Canada was a preferred country 539, those search results 538 from Canadian Web servers would have numerical scores 541 boosted higher than search results 538 from, say, Australian Web servers. Those search results 538 from an alternate preferred country, such as the United States, could also have numerical scores 541 boosted higher than search results 538 from Australian Web servers. However, the search results 538 from Canadian Web servers could still be lower than the search results 538 from United States Web servers if the latter search results 538 provide better overall matches. Alternatively, a counter scoring approach could be used whereby the scorer 533 assigns lower numerical scores 541 to reflect better quality than higher numerical scores 541 and those numerical scores 541 assigned to search results 538 from a Web server associated with a preferred country are demoted to provide a preferred country bias. Other styles, assignments or definitions of search result scoring are feasible, as would be recognized by one skilled in the art. As well, the Web servers for a preferred country need not be physically located within the borders of the country and only need present a reasonable nexus to a given country with respect to Web content and political, social and similar associations, as would be recognized by one skilled in the art. For instance, Web content from a Canadian Web server may actually be physically located on a proxy Web server located in another country, such as the United States.

In a further embodiment, a toolbar is provided as part of the presentation of a Web page on the graphical user interface of the Web browser 18. The toolbar can be in the form of a client-side application, as is known in the art. The toolbar includes a log, which counts the countries from which users visit Web sites. The predominant country or countries are then determined based on the log. In addition, the toolbar can identify Web sites having a worldwide appeal and which should therefore remain unassigned to a particular country. For instance, the Web site for a multinational company, such as Starbucks Corporation, would not be assigned to the United States.

To determine the preferred countries 539, the country biaser 534 evaluates any available country preferences 542, interface characteristics (IF Chars) 543, and IP characteristics (IP Chars) 544. The country preferences 542 are maintained independent of each HTTP transaction using cookies and must be retrieved from the client 12 prior to executing a search, or via a log-in procedure. The interface characteristics 543 may be determined from the metadata 548 and search engine interface and express country preferences can often be specified as user options. The IP characteristics 544 may be determined from the metadata 548 and the Internet protocol (IP) address of the client, which can be mapped to a country table 540 to determine a country with which the search results 538 are associated.

The country biaser 534 orders the search results 538. In one embodiment, non-numerically ordered search results 538 are ordered by a shifting factor 545, as further described below with reference to FIG. 21. In the described embodiment, a constant shifting factor 545 of two (2.0) is employed to demote search results 538 in non-preferred countries by two positions. This shifting factor 545 is suitable when search results 538 are ordered by decreasing degree of match to the search query 536. For example, a search result 538 in a non-preferred country occurring in the third position of a list of the search results 538 would be demoted to the fifth position. Other forms of shifting factors could be employed as well. For instance, the shifting factor 545 could promote search results 538 in non-preferred countries. As well, the shifting factor 545 could order the search results 538 by mathematical function, using, for example, additive, subtractive, multiplicative, fractional, divisional, and logarithmic factors, or may be a formula or function, as well as various combinations and arrangements thereof, as would be recognized by one skilled in the art.

In another embodiment, preferable when an adjustment formula is available for a range of numerical scores 541, numerically scored search results 538 are adjusted by a weighting factor 546 to promote or "boost" the numerical scores 541, as further describe below with reference to FIG. 22. Such weighting factor 546 may be a constant, mathematical function using, for example, additive, subtractive, multiplicative, fractional, divisional, and logarithmic factors, or may be a formula or function, as well as various combinations and arrangements thereof, as would be recognized by one skilled in the art. In the described embodiment, the numerical scores 541 increase with the quality of match. For example, a higher numerical score 541 reflects a better quality than lower numerical scores 541. Alternatively, a system may be employed whereby the numerical scores 541 could decrease with quality of match, as would be recognized by one skilled in the art.

In the described embodiment, for search results 538 in one of the preferred countries 539, a weighting factor $W_{LP}$ is provided by the equation (5):

$$w_{LP} = \left\{ \forall\, s_{1 \to n} : s_i = \frac{s_i + 1}{2} \right\} \tag{5}$$

The weighting factor is most suitable when numerical scores 541 range between 0.0 and 1.0 and are approximately uniformly distributed. Other ranges of numerical scores and forms of weighting factors could be employed as well, as would be recognized by one skilled in the art.

In a further embodiment, the shifting factor 545 and the weighting factor 546 can be adjusted to accommodate less or more reliable dynamic preferred country determination. For instance, a short search query 536 or sparse search results 537 might lower the accuracy of the dynamic preferred country determination due to less context with which to work. The shifting factor 545 and the weighting factor 546 would be relaxed to less aggressively order the search results 537 Alternatively, a long search query 536 or lengthy search results 537 might increase the accuracy and the shifting factor 545 and the weighting factor 546 would be increased to more aggressively order the search results 537.

In addition, the search engine 21 can optionally include a language promoter (as described above) to determine preferred languages and less preferred languages, such as described in commonly-assigned U.S. provisional patent application Ser. No. 60/459,339, filed Mar. 31, 2003, pending, and U.S. patent application Ser. No. 10/407,476, filed Apr. 3, 2003, pending, the disclosures of which are incorporated by reference. In the described embodiment, the language promoter evaluates interface characteristics, IP characteristics, and search result characteristics for providing preferred language ordering of search results 537, either in conjunction with or as an adjunct to the country biaser 534.

Finally, the presenter 535 presents the ordered search results 537 to the user 19 via the browser 18. Typically, only a part of the ordered search results 537 need be presented since the full set of ordered search results 537 can exceed available presentation space on the browser 18. Presentation is the communication of the ordered search results 537 by means of a search result response message.

Search Query Execution and Search Results Processing

Figure 15:
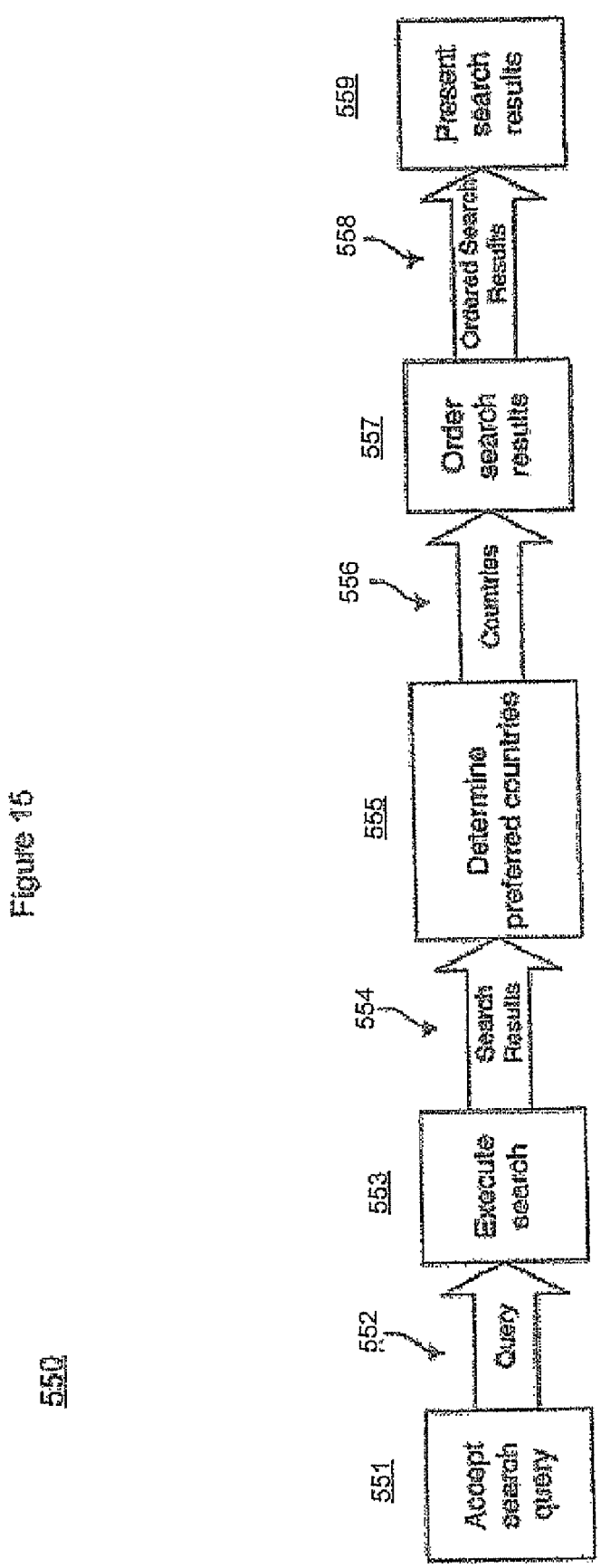
FIG. 15 is a process flow diagram showing search query execution and search results processing by the country component of the search engine of FIG. 2.

FIG. 15 is a process flow diagram 550 showing search query execution and search results processing by the country component of the search engine 21 of FIG. 2. The process flow proceeds in five primary phases. First, a search query 552 is accepted and parsed (process 551) and is forwarded to the next phase. A search is executed (process 553) against a stored data repository and search results 554 are forwarded to the next phase. The preferred countries 556 of the user 19 are determined (process 555) based on metadata, the search engine interface, the IP address of the client, and other available context. The preferred countries 556 are forwarded to the next phase for use in ordering the search results 554 (process 557). In the final phase, the ordered search results 558 are forwarded and presented (process 559). The phases of determining the preferred countries (process 555) and ordering the search results (process 557) enhance the quality of the search results by tailoring the search results in accordance with dynamically determined user country preferences.

Method Overview

Figure 16:
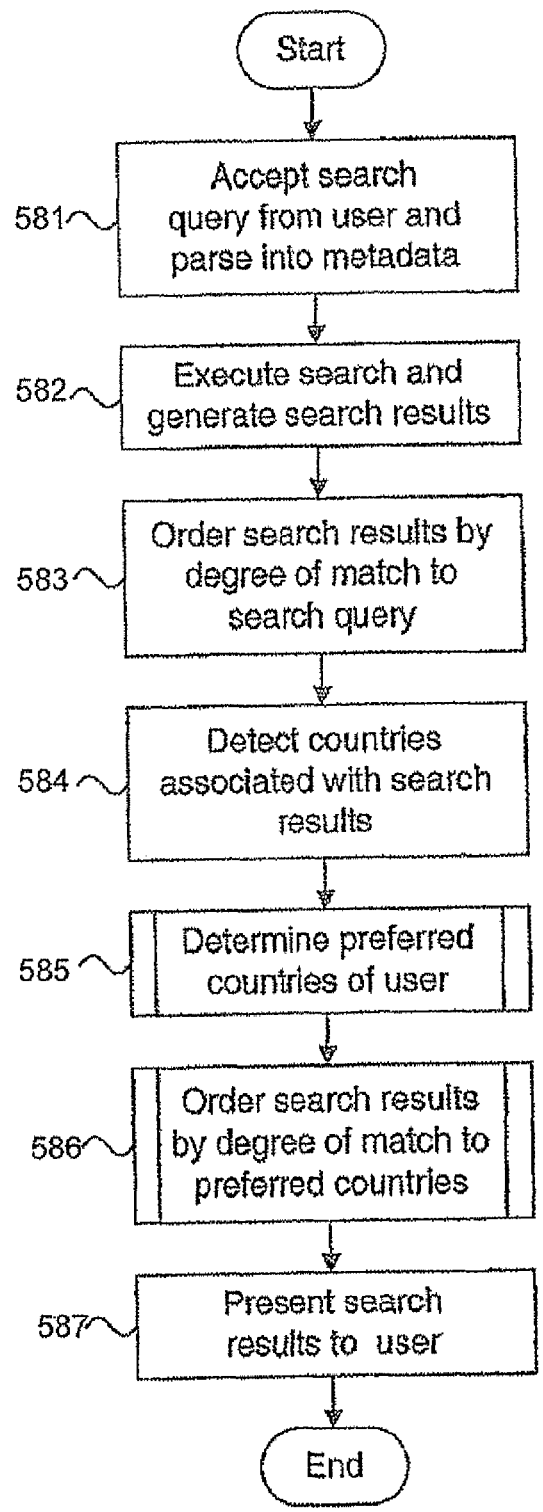
FIG. 16 is a flow diagram showing a method for providing preferred country biasing of search results, in accordance with the present invention.

FIG. 16 is a flow diagram showing a method 580 for ordering search results 538, in accordance with the present invention. The method 580 is described as a sequence of process operations or steps, which can be executed, for instance, by the country component of the search engine 21 (shown in FIG. 2).

A search query 536 is accepted from a user 19 and parsed into metadata 548 (block 581). A search is executed on a searchable data repository 547 by evaluating the search query 536 against information characteristics maintained in the searchable data repository 547 and search results 538 are generated (block 582). Since thousands or even millions of search results 538 can potentially be generated, only a subset of the search results 38, typically between 100 to 10,000, are retained as the most promising search results 538. Prior to providing the search results 538 to the browser 18, the search results 538 can be temporarily staged as "raw" Web pages, structured data, or unstructured data, from which metadata describing the characteristics of each search result 538 can be extracted, as is known in the art. The search results 538 are qualitatively ordered by degree of match to the search query 536 (block 583) to provide a ranking or scoring, including a numerical score 541, reflecting search result quality, as described above with reference to FIG. 14. The countries associated with the search results 538 are detected (block 584). The countries can be determined from the URL extension of each search result 538 or by examining the domain registrar address and inferring the country of business. The country can also be inferred from the IP address of the Web server from which the search result 538 was obtained, from the search result document, or from other Web pages on the same Web site or by examining the anchor text of the hyperlinks to the search result document, the text near the hyperlinks, or the countries of the Web pages with hyperlinks to the search result documents. A combination of the foregoing methods can be combined to provide more accurate results. In addition, other techniques for detecting the countries associated with search results are possible, as would be recognized by one skilled in the art.

Up to this point, the search results 538 have been identified and ranked or scored. The preferred countries 539 of the requesting user 19 are then determined (block 585), as further described below with reference to FIG. 17. The search results 538 are then ordered by degree of match to the preferred countries 539 (block 586), as further described below with reference to FIG. 20. For efficiency, preferably only a subset of the most promising search results 538, typically in the range of 15 to 30 search results, are ordered, although other ranges could be used, as would be recognized by one skilled in the art. Finally, the ordered search results 537 are presented via the browser 18 (block 587). Typically, only a part of the ordered search results 537 need be presented since the full set of ordered search results 537 can exceed available presentation space on the browser 18. In the described embodiment, the search query 536 is provided as an HTTP-compliant request message and each search result is provided back to the user 19 as an HTTP-compliant response message.

In a further embodiment, the preferred countries 539 are stored for future use while executing search queries 536 from the same requesting user 19. As well, the ability to present the ordered search results 537 using preferred country ordering could be controlled by enabling or disabling presentation in the preferred countries 539 using a "toggle" provided via the user interface. In a still further embodiment, the ordered search results 537 are grouped together in each of the preferred countries 539 prior to presentation to the requesting user 19. Alternatively, the ordered search results 537 in the preferred countries 539 can be arranged for presentation next to those search results in non-preferred countries, such as by using adjacent columns or cells in a table. The routine then terminates.

Determining Preferred Countries

Figure 17:
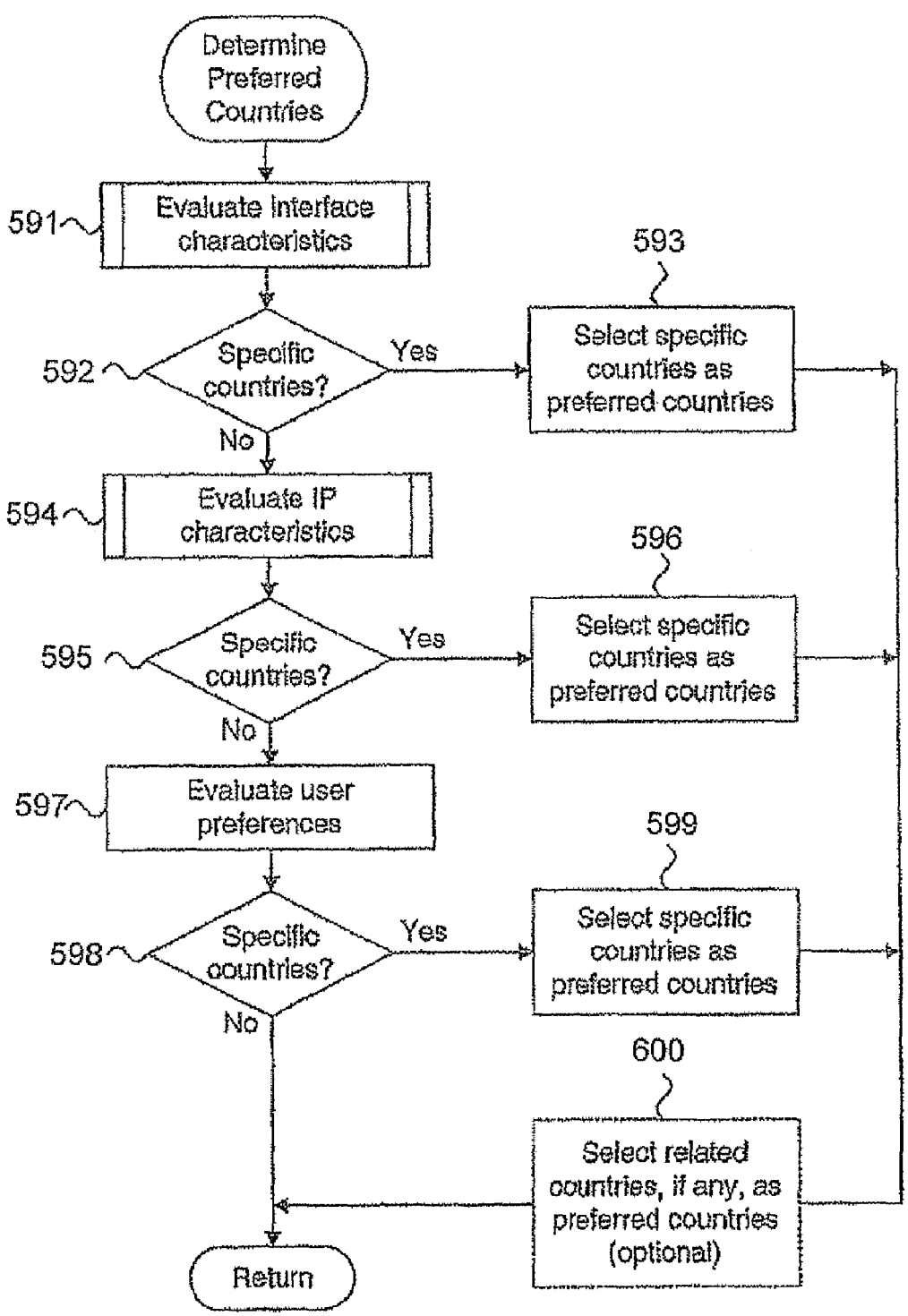
FIG. 17 is a flow diagram showing the routine for determining preferred countries for use in the method of FIG. 16.

FIG. 17 is a flow diagram showing the routine 590 for determining preferred countries 539 for use in the method 580 of FIG. 16. The purpose of this routine is to determine the preferred countries 539 of the requesting user 19 based on interface characteristics 543 and IP characteristics 544.

First, the interface characteristics 543 are evaluated (block 591) based on the metadata 548 parsed from the search query 536 and the search engine interface, as further described below with reference to FIG. 18. If specific countries can be determined based on the interface characteristics 543 (block 592), the specific countries are selected as the preferred countries 539 (block 593). Next, if no specific countries can be determined from the interface characteristics 543 (block 592), the IP characteristics 544 are evaluated (block 594) based on the metadata 548 parsed from the search query 536 and the IP address of the client, as further described below with reference to FIG. 19. If specific countries can be determined based on the IP characteristics 544 (block 595), the specific countries are selected as the preferred countries 539 (block 596). Next, if no specific countries can be determined from the IP characteristics 544 (block 595), the user preferences are evaluated, including the country preferences 542 (block 597). If specific countries can be determined based on the user preferences (block 598), the specific countries are selected as the preferred countries 539 (block 599). If no specific countries can be determined from the user preferences (block 595), a default or equivalent country is used. The routine then returns.

In the described embodiment, the search results 538 are provided in one of two formats. First, the search results 538 can be grouped as a collection of "raw" Web pages from which country characteristics can be determined. Second, the search results 538 can be organized into metadata describing the various characteristics, including country characteristics, and content of the Web pages corresponding to the search results 538. The predominant country or language of each search result 538 can be dynamically determined through content analysis, such as described in U.S. Pat. No. 6,167,369, issued Dec. 26, 2000 to Schulze, the disclosure of which is incorporated by reference.

For each instance in which one or more preferred country 539 has been selected (blocks 593, 596 and 599), related, alternate and less preferred countries, if any, can optionally be selected as additional preferred countries 539 (block 600). Related, alternate and less preferred countries include those countries having a reasonable nexus to a given country with respect to Web content and political, social and similar associations, as would be recognized by one skilled in the art, or which a user simply indicates as being related, alternate and less preferred. For instance, Canada and the United States share numerous attributes and Canadian users may find Web content retrieved from United States Web servers equally useful. Following any additions to the preferred countries 539, the routine returns.

Evaluating Interface Characteristics

Figure 18:
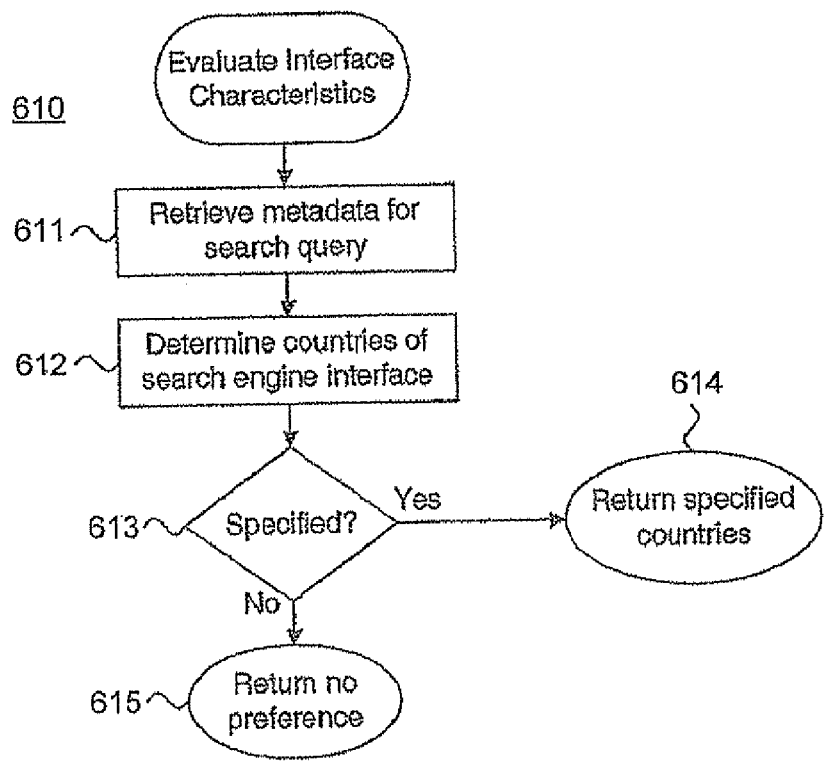
FIG. 18 is a flow diagram showing the function for evaluating interface characteristics for use in the routine of FIG. 17.

FIG. 18 is a flow diagram showing the function 610 for evaluating interface characteristics 543 for use in the routine 590 of FIG. 17. The purpose of this function is to determine any preferred countries 539 based on available metadata 548 parsed from the headers of the search query request message and the search engine interface.

First, any available metadata 548 corresponding to the headers of a search query request message are retrieved (block 611). Any specified countries are determined (block 612) by evaluating the search engine interface. The user interface is generated by the search engine 21 and express country preferences can often be specified as user options. Thus, any available country preferences are first determined. For example, a country-specific search engine interface, such as www.google.co.uk or www.google.de could respectively indicate user preferences for Web content retrieved from Web servers associated with the United Kingdom and Germany. Server-side country preferences are maintained either directly in a cookie stored at the client, or by the search engine 21 and accessed using cookies or log-in procedures to uniquely identify each requesting user 19. If available, the appropriate country-identifying cookie is retrieved, or the appropriate user log-in procedure is performed. If specified (block 613), the specified countries are returned (block 614). Otherwise, no country preferences are returned (block 615).

Evaluating IP Characteristics

Figure 19:
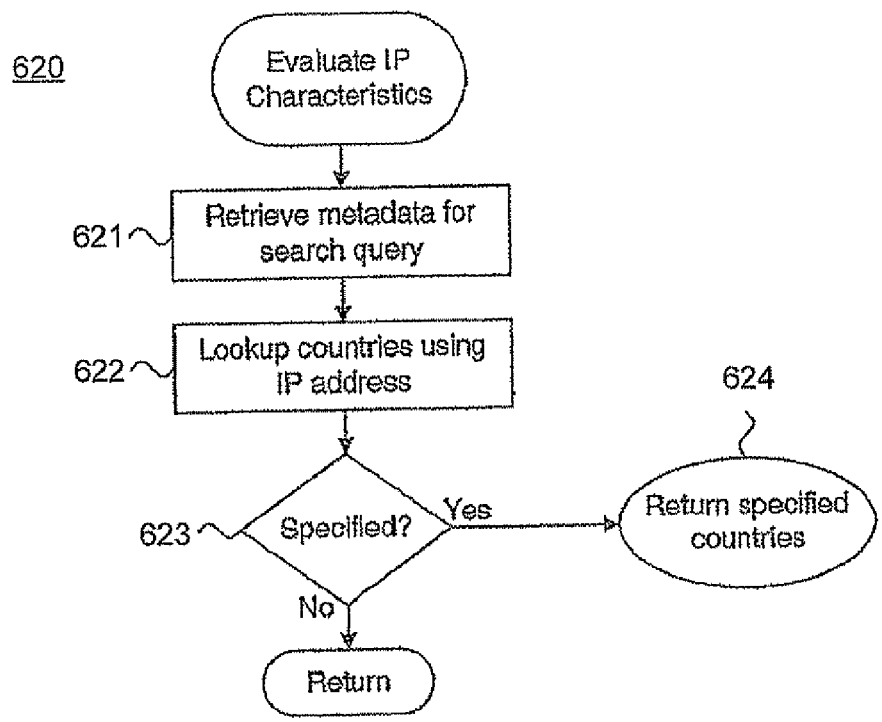
FIG. 19 is a flow diagram showing the function for evaluating IP characteristics for use in the routine of FIG. 17.

FIG. 19 is a flow diagram showing the function 620 for evaluating IP characteristics 544 for use in the routine 590 of FIG. 17. The purpose of this function is to determine any preferred countries 539 based on available metadata 548 parsed from the headers of the search query request message and the IP address of the client.

First, any available metadata 548 corresponding to the headers of a search query request message are retrieved (block 621). Any specified countries are obtained (block 612) by performing lookup mapping the IP address of the client to the country table 540. The location of the client 12 from which the search query 536 was sent can be determined by evaluating the header of the Transmission Control Protocol (TCP) packet within which the search query 536 was sent. The TCP header specifies an IP address, which is a 32-bit numeric address written as four numbers separated by periods. An IP domain can be determined by a Domain Name Service lookup of the last number in the IP address, as is known in the art. Other forms of client address mapping in addition to TCP/IP are feasible, as would recognized by one skilled in the art. In the described embodiment, the predominant country for the domain specified in the IP address of the client 12 is selected using the country table 540 (block 623) and returned (block 624). Otherwise, if no IP address is provided (block 623), no country preferences are returned.

Ordering Search Results

Figure 20:
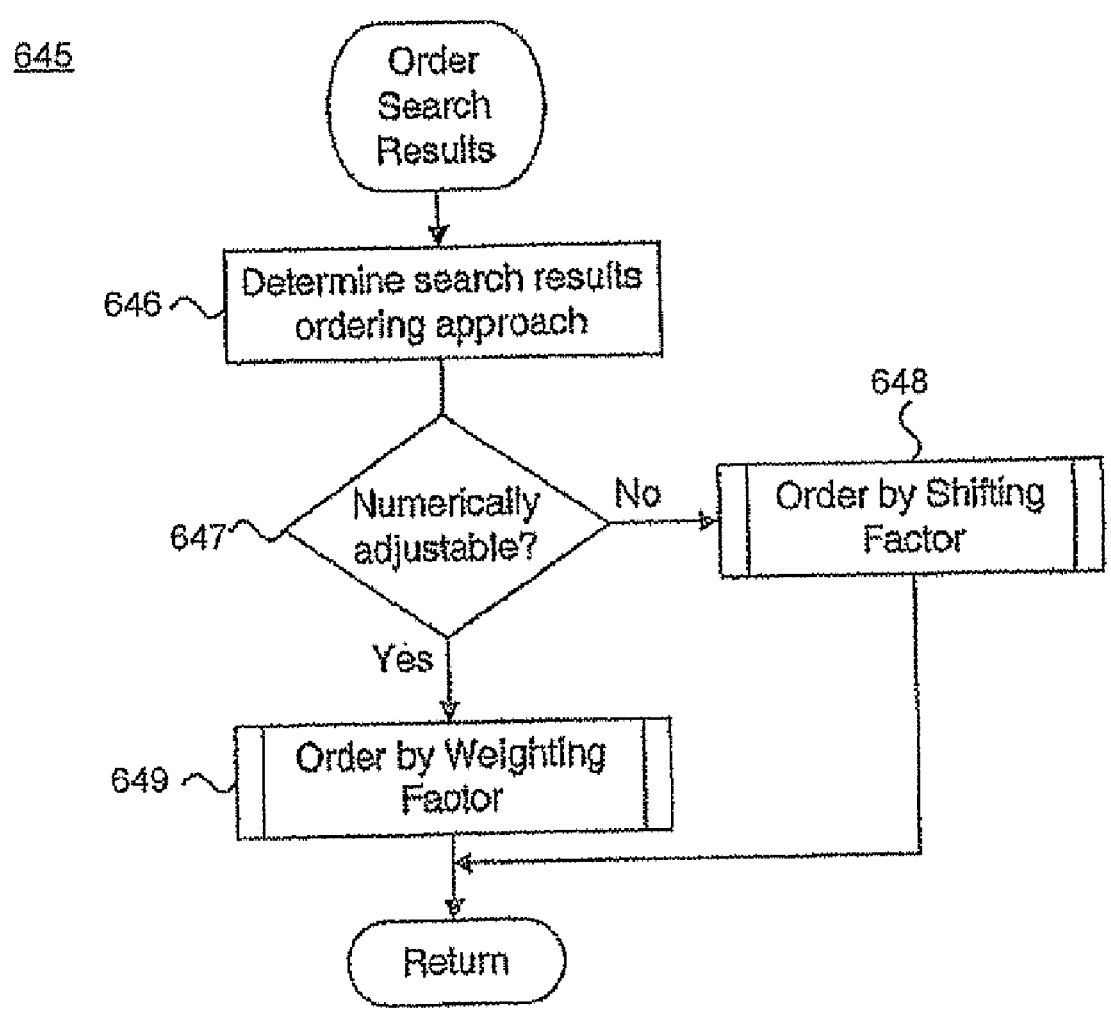
FIG. 20 is a flow diagram showing the routine for ordering search results for use in the method of FIG. 16.

FIG. 20 is a flow diagram showing the routine 645 for ordering search results 538 for use in the method 580 of FIG. 16. The purpose of this routine is to order the search results 538 based on the ranking or ordering method used, if any, by the search engine 21 in consideration of the preferred countries 539.

First, the approach utilized by the search engine 21 to rank or order the search results 538 is determined (block 646). If the numerical scores 541 assigned to the search results 538 are suitable for numerical adjustment (block 647), a numerical scoring approach is utilized, whereby the search results 538 are ordered using a weighting factor 546 (block 649), as further described below with reference to FIG. 22. Otherwise, the search results 538 are ordered by using a shifting factor 26 (block 648), as further described below with reference to FIG. 21. The routine then returns.

Ordering Search Results by a Shifting Factor

Figure 21:
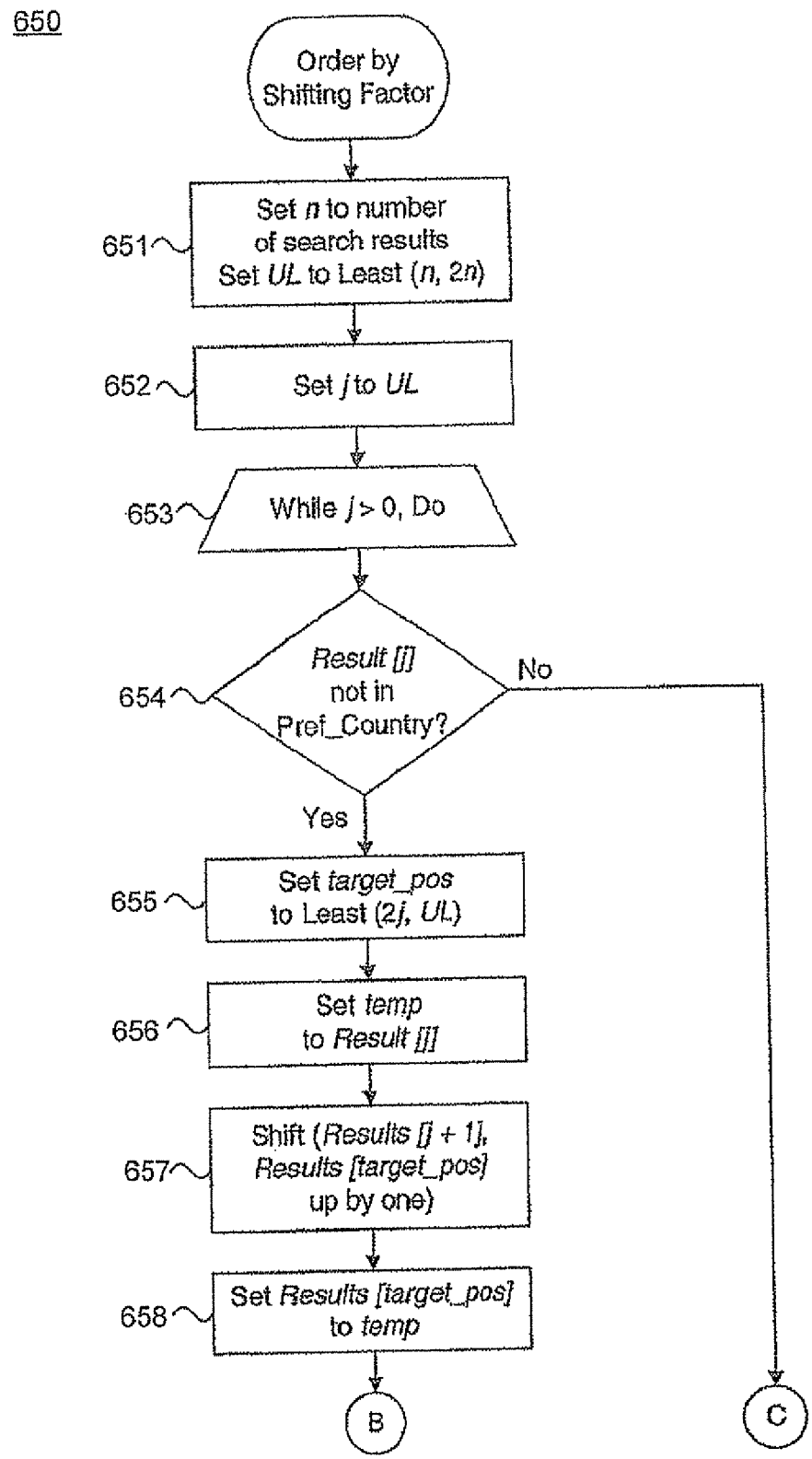
FIG. 21 is a flow diagram showing the routine for ordering search results by a shifting factor for use in the routine of FIG. 20.
Figure 21:
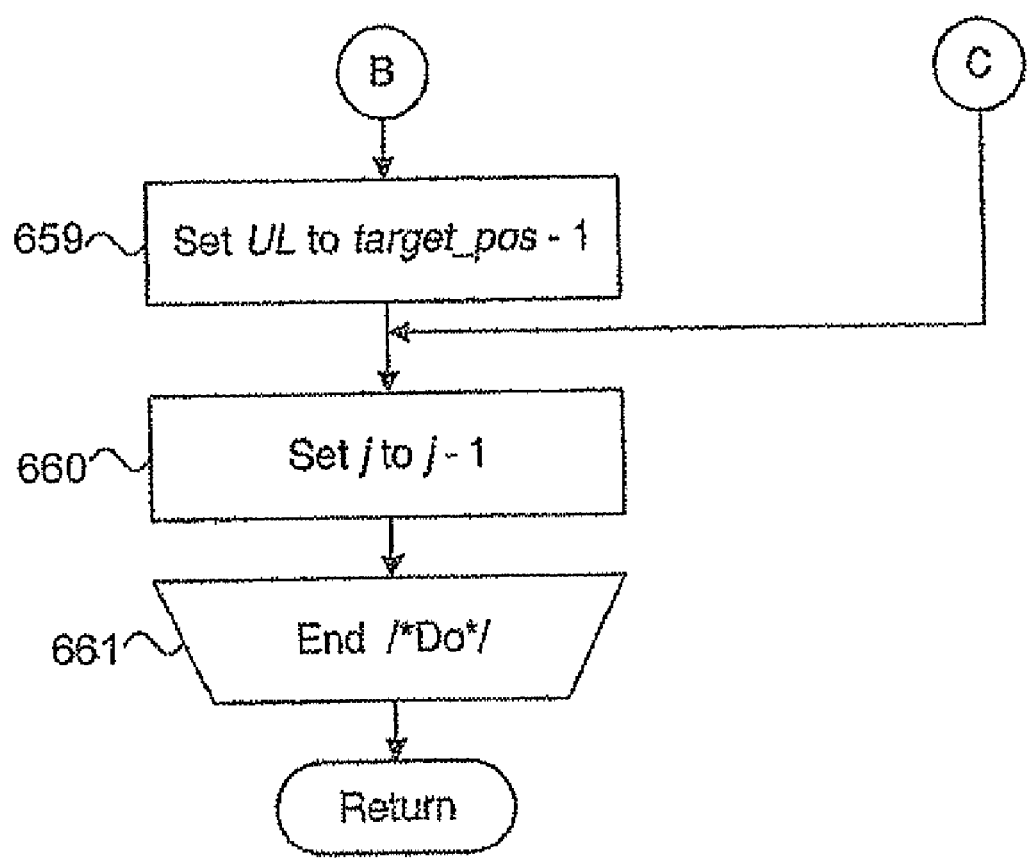

FIG. 21 is a flow diagram showing the routine 650 for ordering search results 538 by a shifting factor 545 for use in the routine 630 of FIG. 19. The purpose of this routine is to shift search results 538 associated with a non-preferred country down in relation to search results 538 associated with a preferred country 539. In the described embodiment, a constant shifting factor 545 of two (2.0) is employed to demote search results 538 in non-preferred countries by two positions. This shifting factor 545 is suitable when search results 538 are ordered by decreasing degree of match to the search query 536. For example, a search result 538 in a non-preferred country occurring in the third position of a list of the search results 538 would be demoted to the fifth position. Other forms of shifting factors could be employed as well. For instance, the shifting factor 545 could promote search results 538 in non-preferred countries. As well, the shifting factor 545 could order the search results 538 by mathematical functions, including additive, subtractive, multiplicative, fractional, divisional, and logarithmic factors, as well as various combinations and arrangements thereof, as would be recognized by one skilled in the art.

In one embodiment, the routine operates on a subset less than or equal to the total number of search results 538, although other forms of subset selection criteria could be used, as would be recognized by one skilled in the art. A variable n is set to the number of search results to be displayed to the user 19 and an upper limit UL for preferred countries 539 is set to the lesser of the number of search results 538, n, and twice n (block 651). The search results 538 are then ordered in an iterative processing loop (blocks 653-661) as follows. First, an index j is set to the upper limit UL (block 652) and processing is performed while the index j is positive (block 653). The search results are maintained in an array Result[ ]. If Result [j] is associated with a preferred country Pref_Country (block 654), Result [j] is skipped. Otherwise, if Result [j] is not associated with a preferred country Pref_Country (block 654), Result [j] is demoted by the shifting factor 545, as follows. A variable target_pos is set to the lesser of twice j and upper limit UL (block 655) and a temporary variable, temp, is set to Result [j] (block 656). The remaining search results 538 are promoted by shifting Results [j+1] through Results [target_pos] up by one (block 657) and Result [target_pos] is set to temp (block 658). The upper limit UL is set to target_pos minus one (block 659). The index j is set to j minus one (block 660) and processing continues with the next loop iteration (block 661), after which the routine returns.

Ordering Search Results by a Weighting Factor

Figure 22:
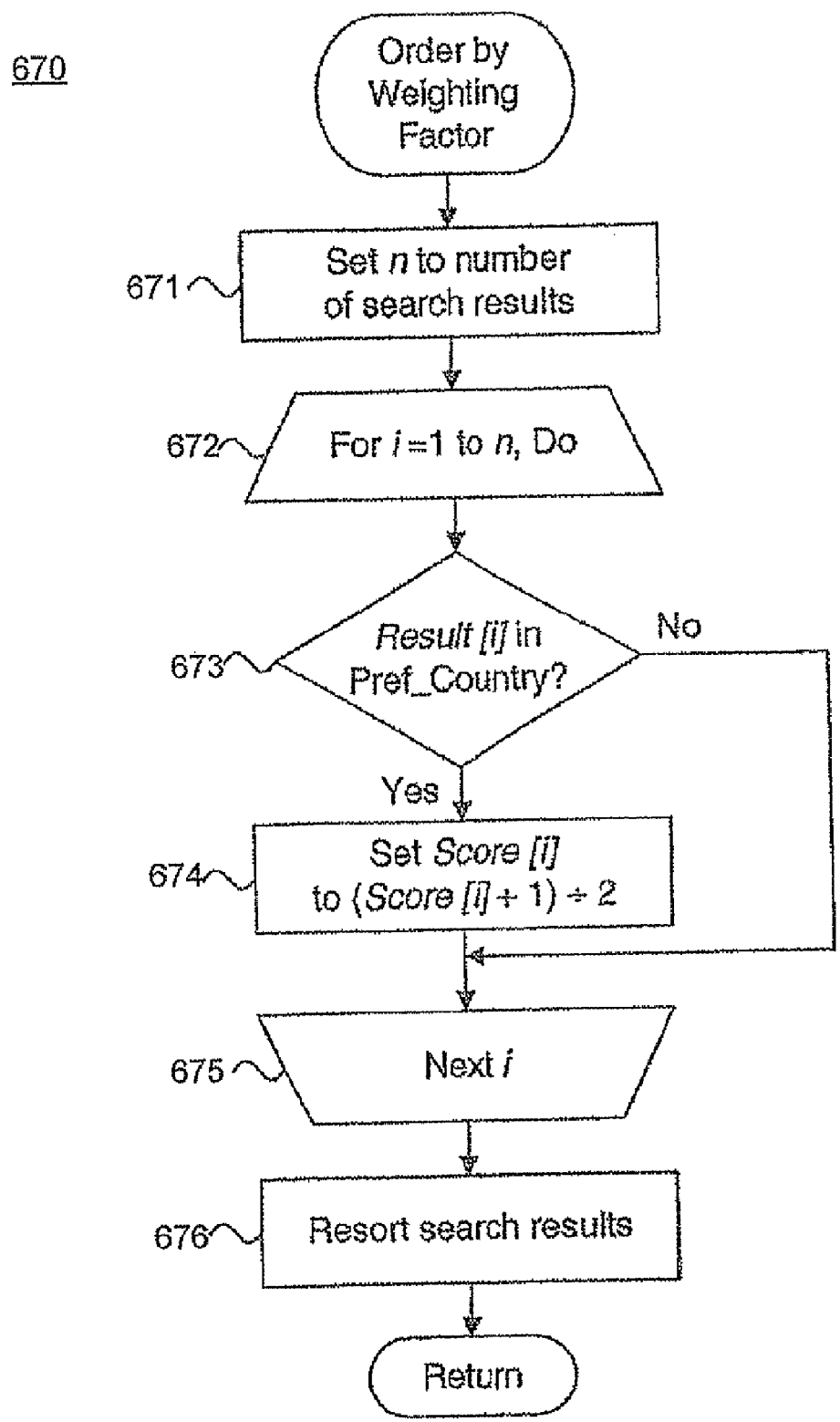
FIG. 22 is a flow diagram showing the routine for ordering search results by a weighting factor for use in the routine of FIG. 20.

FIG. 22 is a flow diagram showing the routine 670 for ordering search results 538 by a weighting factor 546 for use in the routine 630 of FIG. 19. The purpose of this routine is to order the search results 538 by recalculating the numerical score 541 assigned to each search result 538 to favor those search results in either one of the preferred countries 539. In one embodiment, the routine operates on a subset less than or equal to the number of search results 538, which equals the number of search results 538 to be displayed to the user multiplied by a margin, for instance, 2 or 3, although other forms of subset selection criteria could be used, as would be recognized by one skilled in the art.

In the described embodiment, the numerical scores 541 increase with the quality of match. For example, a higher numerical score 541 reflects a better quality than lower numerical scores 541. Alternatively, a system may be employed whereby the numerical scores 541 could decrease with quality of match, as would be recognized by one skilled in the art. In the described embodiment, a weighting factor 547 is used to increase the numerical score 541 of each search result 538 in one of the preferred countries 539. For search results 538 in one of the preferred countries 539, a weighting factor $W_{LP}$ is provided by the equation (6):

$$w_{LP} = \left\{ \forall\, s_{1 \to n} : s_i = \frac{s_i + 1}{2} \right\} \qquad (6)$$

The weighting factor is most suitable when numerical scores 541 range between 0.0 and 1.0 and are approximately uniformly distributed. Other ranges of numerical scores and forms of weighting factors could be employed as well, as would be recognized by one skilled in the art.

The routine operates on a subset less than or equal to the total number of search results 538 and recalculates the numerical scores 541 through an iterative processing loop (blocks 672-677) as follows. A variable n is set to the number of search results to be multiplied by a margin, for instance 2 or 3 (block 671). The search results 538 are maintained in an array Results[ ]. The numerical score 541 for each search result 538 is recalculated in the iterative processing loop (blocks 672-677) indexed by a variable i. During each iteration (block 672), if Result [i] is associated with a preferred country Pref_Country (block 673), Score [i] is set to half the quantity Score[i] plus one (block 674), that is, Equation (5). Otherwise, if Result [i] is not associated with a preferred country, no numerical score adjustment is required and Result [i] is skipped. Processing continues with the next iteration (block 675). After all iterations, the search results 538 are resorted (block 676), after which the routine returns.

While the invention has been particularly shown and described as referenced to the embodiments thereof, those skilled in the art will understand that the foregoing and other changes in form and detail may be made therein without departing from the spirit and scope of the invention.

What is claimed:

1. A method comprising:
   receiving, by a processor, a search query;
   performing, by the processor, a search based on the search query to identify search results in a plurality of search result languages;
   identifying, by the processor, a particular language for the search results based on weighing characteristics of the search query, weighing characteristics of a user interface via which the search query is received, and weighing characteristics of the search results;
   ordering, by the processor, the search results to create an ordered list of search results;
   determining, by the processor, whether the search results, in the ordered list of search results, are in the particular language;
   adjusting, by the processor, the ordering of one of the search results among other ones of the search results to create an adjusted list of search results when the one of the search results is in the particular language; and
   providing for presentation, by the processor, the adjusted list of search results.

2. The method of claim 1, where identifying the particular language includes:
   determining the particular language based on the search query by evaluating at least one of a language used in the search query or a character encoding used in the search query.

3. The method of claim 1, where identifying the particular language includes:
   determining the particular language using the characteristics of the user interface when the particular language cannot be determined based on the search query.

4. The method of claim 3, where determining the particular language using the characteristics of the user interface includes:
   evaluating, to identify the particular language, at least one of:
      a first language specified as a stored preference independent of the search query,
      a second language specified by the user interface,
      a character encoding specified by the user interface, or
      a network address of a client application from which the search query was submitted.

5. The method of claim 1, where identifying the particular language includes:
   determining the particular language using at least some of the search results when the characteristics of the user interface identify the particular language as corresponding to a predetermined language.

6. The method of claim 5, where identifying the particular language further includes:
   evaluating a language used in a majority of the search results to identify the particular language.

7. The method of claim 1, where adjusting the ordering of the one of the search results includes one of:
   demoting each of the search results, that is in a language other than the particular language, by at least one position within the ordered list of search results, and promoting each of the search results, that is in the particular language, by at least one position within the ordered list of search results; or
   promoting each of the search results, that is in a language other than the particular language, by at least one position within the ordered list of search results, and demoting each of the search results, that is in the particular language, by at least one position within the ordered list of search results.

8. The method of claim 1, further comprising:
   identifying a second language that is different than the particular language;
   determining whether the search results, in the ordered list of search results, are in the second language; and
   adjusting the ordering of a particular search result, of the search results, among other ones of the search results, when the particular search result is in the second language.

9. A method comprising:
   receiving, by a processor, a search query;
   performing, by a processor, a search based on the search query to identify search results from a plurality of search result countries;
   identifying, by a processor, a particular country for the search results based on weighing interface characteristics and weighing Internet protocol (IP) characteristics, where the interface characteristics include information from the search query and information from a user interface via which the search query is received, and where the IP characteristics include information associated with a location from which the search query was sent;
   ordering, by a processor, the search results to create an ordered list of search results;
   determining, by a processor, whether the search results in the ordered list of search results are from the particular country;
   adjusting, by a processor, the order of one of the search results among other ones of the search results to create an adjusted list of search results when the one of the search results is from the particular country; and
   providing for presentation, by a processor, the adjusted list of search results.

10. The method of claim 9, where adjusting the order of the one of the search results includes one of:
   demoting each of the search results, from a country other than the particular country, by at least one position within the ordered list of search results, and promoting each of the search results, from the particular country, by at least one position within the ordered list of search results; or promoting each of the search results, from a country other than the particular country, by at least one position within the ordered list of search results, and demoting each of the search results, from the particular country, by at least one position within the ordered list of search results.

11. The method of claim 9, further comprising:

assigning a numerical score to each of the search results; and adjusting the numerical score of at least one of the search results from the particular country.

12. The method of claim 11, further comprising one of:

increasing the numerical scores assigned to the search results from the particular country, and maintaining the numerical scores assigned to the search results from a country other than the particular country; or decreasing the numerical scores assigned to the search results from the particular country, and maintaining the numerical scores assigned to the search results from a country other than the particular country.

13. The method of claim 11, where adjusting the order of the at least one of the search results includes:

sorting the search results based on the adjusted numerical score of the at least one of the search results.

14. The method of claim 9, further comprising:

identifying a second country that is different than the particular country;

determining whether the search results, in the ordered list of search results, are from the second country; and adjusting the ordering of a particular search result, of the search results, among other ones of the search results, when the particular search result is from the second country.

15. A non-transitory computer-readable storage medium comprising:

one or more instructions which, when executed by at least one processor, cause the at least one processor to receive a search query;

one or more instructions which, when executed by the at least one processor, cause the at least one processor to perform a search based on the search query to identify search results in a plurality of search result languages;

one or more instructions which, when executed by the at least one processor, cause the at least one processor to identify a particular language for the search results based on weighing characteristics of the search query, weighing characteristics of a user interface via which the search query is received, and weighing characteristics of the search results;

one or more instructions which, when executed by the at least one processor, cause the at least one processor to determine whether the search results are in the particular language;

one or more instructions which, when executed by the at least one processor, cause the at least one processor to order the search results to create an ordered list of search results, where a position of one of the search results, within the ordered list of search results, is based on whether the one of the search results is in the particular language; and one or more instructions which, when executed by the at least one processor, cause the at least one processor to provide, for presentation, the ordered list of search results.

16. The computer-readable storage medium of claim 15, further comprising:

one or more instructions to assign a numerical score to each of the search results; and one or more instructions to adjust the numerical score of at least one of the search results that is in the particular language.

17. The computer-readable storage medium of claim 16, further comprising one of:

one or more instructions to increase the numerical scores assigned to the search results that are in the particular language, and maintain the numerical scores assigned to the search results that are in a language other than the particular language; or one or more instructions to decrease the numerical scores assigned to the search results that are in the particular language, and maintain the numerical scores assigned to the search results in a language other than the particular language.

18. The computer-readable storage medium of claim 16, where the one or more instructions to order the search results include:

one or more instructions to sort the at least one of the search results based on the adjusted numerical score.

19. The computer-readable storage medium of claim 16, where the numerical score is adjusted in accordance with the formula:

$$s_i = \frac{s_i + 1}{2}$$

where $s_i$ comprises the numerical score for a search result i of the at least one of the search results.

20. The computer-readable storage medium of claim 16, further comprising:

one or more instructions to determine a second language that is different from the particular language; and one or more instructions to increase the numerical score assigned to at least one of the search results that is in the second language.

21. The computer-readable storage medium of claim 16, further comprising:

one or more instructions to determine a second language that is different from the particular language; and one or more instructions to decrease the numerical score assigned to at least one of the search results that is in the second language.

22. A non-transitory computer-readable storage medium comprising:

one or more instructions which, when executed by at least one processor, cause the at least one processor to receive a search query;

one or more instructions which, when executed by the at least one processor, cause the at least one processor to perform a search based on the search query to identify search results from a plurality of search result countries;

one or more instructions which, when executed by the at least one processor, cause the at least one processor to identify a particular country for the search results based on weighing interface characteristics and weighing Internet protocol (IP) characteristics, where the interface characteristics include information from the search query and information from a user interface via which the search query is received, and where the IP characteristics include information associated with a location from which the search query was sent;
one or more instructions which, when executed by the at least one processor, cause the at least one processor to determine whether the search results are from the particular country;
one or more instructions which, when executed by the at least one processor, cause the at least one processor to order the search results to create an ordered list of search results, where a position of one of the search results, within the ordered list of search results, is based on whether the one of the search results is from the particular country; and
one or more instructions which, when executed by the at least one processor, cause the at least one processor to provide, for presentation, the ordered list of search results.

23. The computer-readable storage medium of claim 22, where the one or more instructions to order the search results include:
one or more instructions to order at least some of the search results, from the particular country, by one of:
demoting each of the search results, from a country other than the particular country, by a predefined shifting factor, and promoting each of the search results, from the particular country, by at least one position within the ordered list of search results; or
promoting each of the search results, from a country other than the particular country, by a predefined shifting factor, and demoting each of the search results, from the particular country, by at least one position within the ordered list of search results.

24. The computer-readable storage medium of claim 22, further comprising:
one or more instructions to identify a second country that is different than the particular country;
one or more instructions to determine whether the search results in the ordered list of search results are from the second country; and
one or more instructions to adjust the ordering of a particular search result, of the search results, among other ones of the search results when the particular search result is from the second country.

25. A device, comprising:
a memory to store instructions; and
a processor to execute the instructions to:
receive a search query,
perform a search based on the search query to identify search results in a plurality of search result languages and from a plurality of search result countries,
identify a particular language for the search results based on weighing characteristics of the search query, weighing characteristics of a user interface via which the search query is received, and weighing characteristics of the search results,
identify a particular country for the search results based on interface characteristics and Internet protocol (IP) characteristics,
order the search results to create an ordered list of search results, where a position of one of the search results, within the ordered list of search results, is based on whether the one of the search results is in the particular language or from the particular country, and
provide, for presentation, the ordered list of search results.

26. The device of claim 25, where, when ordering the search results, the processor is to:
assign a numerical score to each of the search results, and one of:
increase the numerical scores assigned to the search results that are in the particular language, and maintain the numerical scores assigned to the search results that are in a language other than the particular language, or
decrease the numerical scores assigned to the search results that are in the particular language, and maintain the numerical scores assigned to the search results in a language other than the particular language.

27. The device of claim 25, where, when ordering the search results, the processor is to:
assign a numerical score to each of the search results, and one of:
increase the numerical scores assigned to the search results that are from the particular country, and maintain the numerical scores assigned to the search results that are from a country other than the particular country, or
decrease the numerical scores assigned to the search results that are from the particular country, and maintain the numerical scores assigned to the search results from a country other than the particular country.

* * * * *